United States Patent [19]

Reimers et al.

[11] Patent Number: 5,794,422
[45] Date of Patent: Aug. 18, 1998

[54] ELECTRIC DRIVE MOWER WITH MOTOR GENERATOR SET

[75] Inventors: Kirk W. Reimers; Dammika Weeratunga, both of Lincoln, Nebr.

[73] Assignee: Ransomes America Corporation, Lincoln, Nebr.

[21] Appl. No.: 557,778

[22] Filed: Nov. 13, 1995

[51] Int. Cl.$^6$ .................................................. A01D 34/58
[52] U.S. Cl. ................................ 56/11.9; 56/7; 180/165
[58] Field of Search .......................... 56/7, 11.9, 10.1, 56/10.6, 10.8; 180/165, 900

[56] References Cited

U.S. PATENT DOCUMENTS

| | | |
|---|---|---|
| 1,401,156 | 12/1921 | Jenkins . |
| 2,417,613 | 3/1947 | Radabaugh . |
| 3,090,184 | 5/1963 | Hadek . |

(List continued on next page.)

OTHER PUBLICATIONS

Bunton Company. Brochure on Bunton Mowers, 1986, pp. 1–20 (Exhibit 8, 20 pages).
Ferris Industries Advertisement for Ferris, Hydro Walk 36, Jan. 1991, Yard and Garden (Jan./1991), p. 30 (Exhibit 3, 1 page).
Ferris Industries, Brochure on Pro Cut Mower, date unknown (Exhibit 9, 4 pages).
Ferris Industries, Advertisement for Hydrowalk 36/48, Jun./1990 (Exhibit 4, 2 pages).

(List continued on next page.)

*Primary Examiner*—Terry Lee Melius
*Attorney, Agent, or Firm*—Harness, Dickey & Pierce, P.L.C.

[57] ABSTRACT

Provided is an electric drive riding greens mower. The mower includes a frame which is supported for movement upon a plurality of ground engaging wheels and upon which are supported a motor generator set and a plurality of reel lawn mowers. An electric motor provides driving torque to enable movement of the mower between and over golf course greens or other surfaces to be mowed, electric motors provide driving torque for each of the reel lawn mowers. The motor generator set provides electrical energy for driving the electric motors, including the primary mover and the electrical motors for the reel type lawn mowers. The motor generator set includes an internal combustion motor which provides the mechanical energy to an electric generator which provides electrical energy in response to the received mechanical energy. Further, the mower may include a hydraulic system for operation of reel lift assemblies and the steering mechanism. Hydraulic pressure is supplied by a hydraulic pump powered by one of an electrical motor receiving electrical energy from the generator or directly from the internal combustion engine. The hydraulic motor outputs hydraulic fluid at a pressure sufficient to operate the reel lift and steering mechanisms. Further, the frame member includes a housing which encloses devices which generally operate at substantial noise levels. The housing includes interior and exterior linings which provide passive noise abatement. Within the housing, an active noise abatement system detects and determines ambient noise within the housing and generates output signals which effectively cancel the noise generated within the housing. Such noise abatement assists in providing quiet operation of the mower.

42 Claims, 13 Drawing Sheets

U.S. PATENT DOCUMENTS

| | | |
|---|---|---|
| 3,103,090 | 9/1963 | Campbell . |
| 3,106,811 | 10/1963 | Heth et al. . |
| 3,217,824 | 11/1965 | Jepson . |
| 3,230,695 | 1/1966 | West . |
| 3,339,353 | 9/1967 | Schreyer . |
| 3,404,518 | 10/1968 | Kasper . |
| 3,425,197 | 2/1969 | Kita . |
| 3,429,110 | 2/1969 | Strasel . |
| 3,472,005 | 10/1969 | Profenna . |
| 3,496,706 | 2/1970 | Mattson . |
| 3,511,033 | 5/1970 | Strasel . |
| 3,570,226 | 3/1971 | Haverkamp et al. . |
| 3,572,455 | 3/1971 | Brueske . |
| 3,581,480 | 6/1971 | O'Conner et al. . |
| 3,602,772 | 8/1971 | Hundhausen et al. . |
| 3,603,065 | 9/1971 | Weber . |
| 3,608,284 | 9/1971 | Erdman . |
| 3,608,285 | 9/1971 | Berk . |
| 3,612,573 | 10/1971 | Hoffman . |
| 3,613,337 | 10/1971 | Akgulian et al. . |
| 3,631,659 | 1/1972 | Horowitz . |
| 3,641,749 | 2/1972 | Dwyer, Jr. et al. . |
| 3,650,097 | 3/1972 | Nokes . |
| 3,668,844 | 6/1972 | Akgulian et al. . |
| 3,698,523 | 10/1972 | Bellinger . |
| 3,721,076 | 3/1973 | Behrens . |
| 3,729,912 | 5/1973 | Weber . |
| 3,731,469 | 5/1973 | Akgulian et al. . |
| 3,732,671 | 5/1973 | Allen et al. . |
| 3,732,673 | 5/1973 | Winn, Jr. . |
| 3,742,685 | 7/1973 | Lian et al. . |
| 3,759,019 | 9/1973 | Wells . |
| 3,800,480 | 4/1974 | Keating . |
| 3,809,975 | 5/1974 | Bartels . |
| 3,832,835 | 9/1974 | Hall et al. . |
| 3,841,069 | 10/1974 | Weck . |
| 3,895,481 | 7/1975 | Olney et al. . |
| 3,910,016 | 10/1975 | Saiia et al. . |
| 3,918,240 | 11/1975 | Haffner et al. . |
| 3,924,389 | 12/1975 | Kita . |
| 3,958,398 | 5/1976 | Fuelling, Jr. et al. . |
| 3,992,858 | 11/1976 | Hubbard et al. . |
| 3,999,643 | 12/1976 | Jones . |
| 4,021,996 | 5/1977 | Bartlett et al. . |
| 4,024,448 | 5/1977 | Christianson et al. . |
| 4,064,680 | 12/1977 | Fleigle . |
| 4,145,864 | 3/1979 | Brewster, Jr. . |
| 4,161,858 | 7/1979 | Gerrits . |
| 4,180,964 | 1/1980 | Pansire . |
| 4,265,146 | 5/1981 | Horrell . |
| 4,301,881 | 11/1981 | Griffin . |
| 4,306,402 | 12/1981 | Whimp . |
| 4,306,404 | 12/1981 | Szymanis et al. . |
| 4,307,559 | 12/1981 | Jupp et al. . |
| 4,318,266 | 3/1982 | Taube . |
| 4,330,981 | 5/1982 | Hall et al. . |
| 4,333,302 | 6/1982 | Thomas et al. . |
| 4,335,569 | 6/1982 | Keeney et al. . |
| 4,351,557 | 9/1982 | Chary . |
| 4,354,569 | 10/1982 | Eichholz . |
| 4,370,846 | 2/1983 | Arnold . |
| 4,395,865 | 8/1983 | Davis, Jr. et al. . |
| 4,423,794 | 1/1984 | Beck ................ 180/165 |
| 4,430,604 | 2/1984 | Loganbill et al. . |
| 4,479,346 | 10/1984 | Chandler . |
| 4,487,006 | 12/1984 | Scag . |
| 4,559,768 | 12/1985 | Dunn . |
| 4,589,249 | 5/1986 | Walker et al. . |
| 4,642,976 | 2/1987 | Owens . |
| 4,663,920 | 5/1987 | Skovhoj . |
| 4,667,460 | 5/1987 | Kramer . |
| 4,686,445 | 8/1987 | Phillips . |
| 4,756,375 | 7/1988 | Ishikura et al. . |
| 4,770,595 | 9/1988 | Thompson et al. . |
| 4,815,259 | 3/1989 | Scott . |
| 4,866,917 | 9/1989 | Phillips et al. . |
| 4,870,811 | 10/1989 | Steele . |
| 4,882,896 | 11/1989 | Wilcox . |
| 4,897,013 | 1/1990 | Thompson et al. . |
| 4,920,733 | 5/1990 | Berrios . |
| 4,943,758 | 7/1990 | Tsurumiya . |
| 4,964,265 | 10/1990 | Young . |
| 4,964,266 | 10/1990 | Kolb . |
| 4,967,543 | 11/1990 | Song et al. . |
| 4,987,729 | 1/1991 | Paytas . |
| 4,995,227 | 2/1991 | Foster . |
| 5,042,236 | 8/1991 | Lamusga et al. . |
| 5,042,239 | 8/1991 | Card . |
| 5,062,322 | 11/1991 | Sinko . |
| 5,069,022 | 12/1991 | Vandermark . |
| 5,085,043 | 2/1992 | Hess et al. . |
| 5,123,234 | 6/1992 | Harada et al. . |
| 5,133,174 | 7/1992 | Parsons, Jr. . |
| 5,140,249 | 8/1992 | Linder et al. . |
| 5,150,021 | 9/1992 | Kamono et al. . |
| 5,163,273 | 11/1992 | Wojtkowski et al. . |
| 5,203,147 | 4/1993 | Long . |
| 5,204,814 | 4/1993 | Noonan et al. . |
| 5,253,729 | 10/1993 | Suzuki . |
| 5,261,213 | 11/1993 | Humphrey . |
| 5,301,494 | 4/1994 | Peot et al. . |
| 5,309,699 | 5/1994 | Ehn, Inc. . |
| 5,319,368 | 6/1994 | Poholek . |
| 5,323,593 | 6/1994 | Cline et al. . |
| 5,330,138 | 7/1994 | Schlessmann . |
| 5,343,680 | 9/1994 | Reichen et al. . |
| 5,415,245 | 5/1995 | Hammond ................ 180/165 |

OTHER PUBLICATIONS

Gravely International, Brochure for Pro Series, Sep./1986, pp. 1–10 (Exhibit 7, 11 pages).

Ransomes America Corporation, Turf Care Equipment Manual, 1994, portion of section entitled Ransomes Reel (Exhibit 1, 44 pages).

Ransomes America Corp., Turf Care Equipment Manual, 1994, portion of section entitled Mounted/Trailed (Exhibit 2, 6 pages).

The Grasshopper Co., Brochure on Model 7187/718K, 1988 (Exhibit 5, 2 pages).

Walker Manufacturing Co., Owners Manual for Model MS36–42 and MC36–54, 1987, pp. 1–45 (Exhibit 6, 47 pages).

Wheel Horse, Parts and Service Manual for Dixie Chopper 5018 Magnum, date unknown (Exhibit 10, 3 pages).

WO 93/12641, Dana R. Lonn et al., Electronic Control for Turf Maintenance Vehicle, Jul./1993 (Exhibit 11, 57 pages).

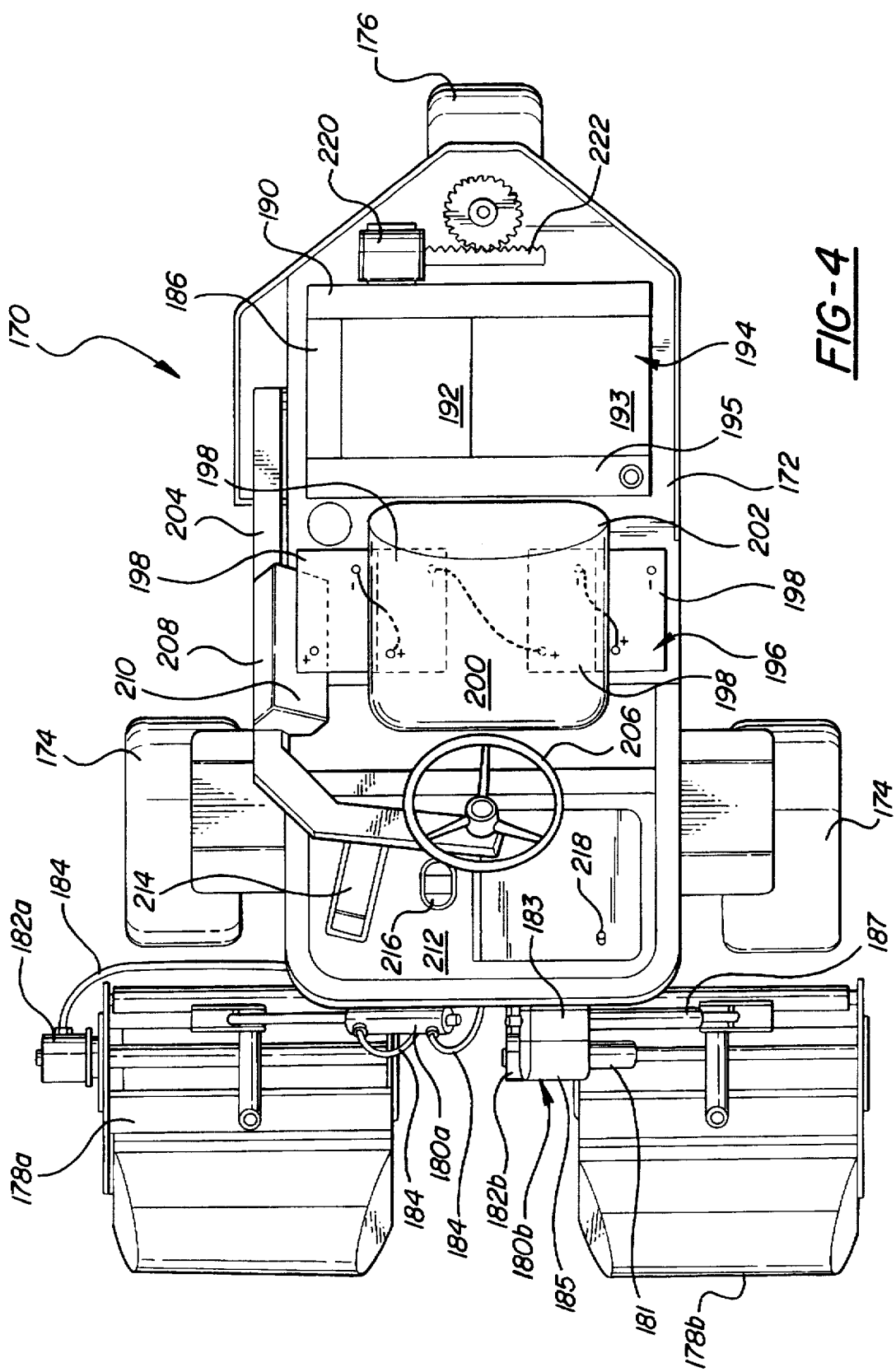

FIG-6b
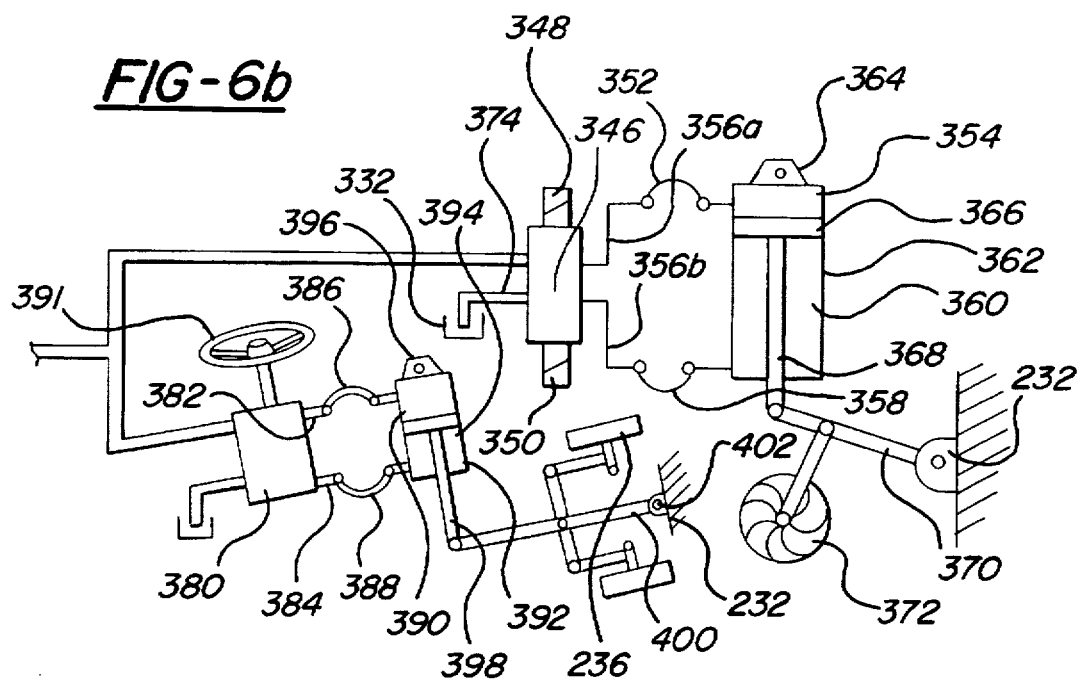
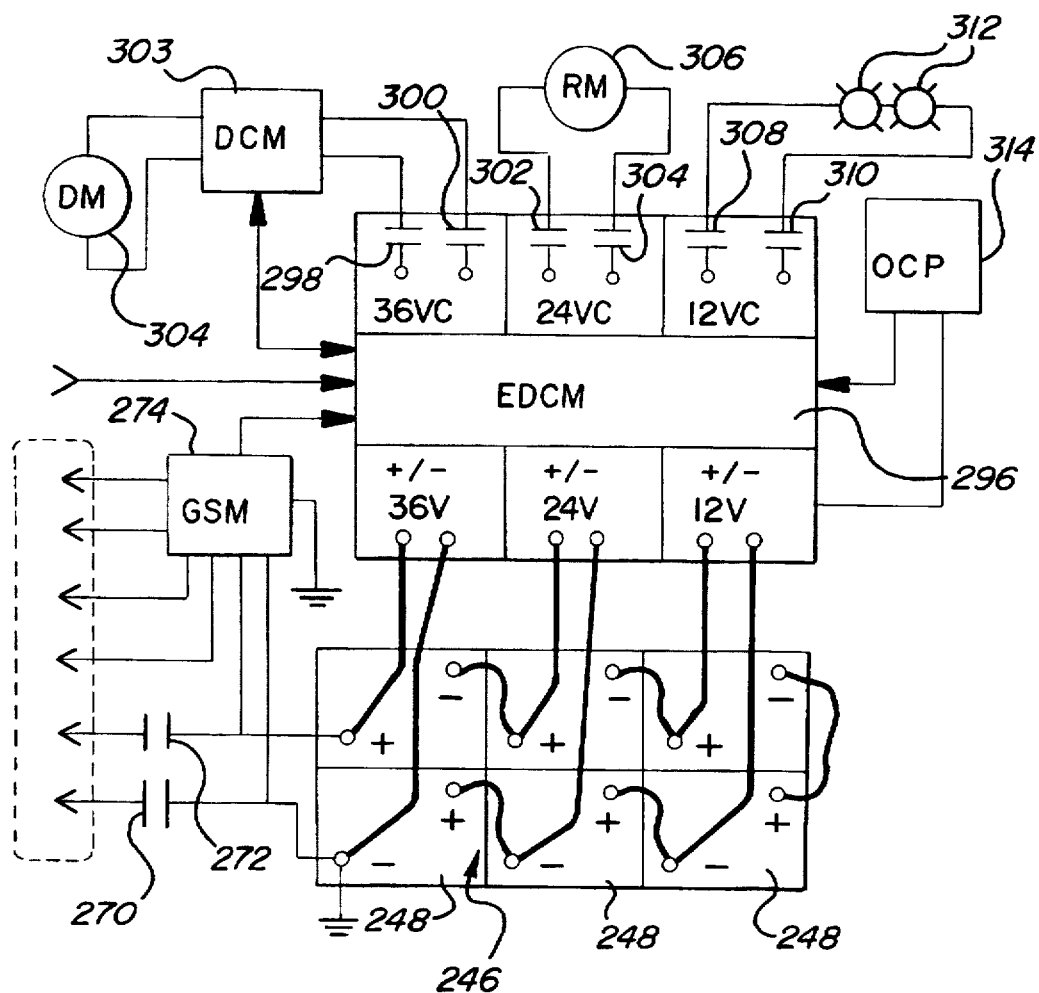

ELECTRIC DRIVE MOWER WITH MOTOR GENERATOR SET

BACKGROUND OF THE INVENTION

1. Field of the Invention

The present invention generally relates to electrically-driven riding mowers for use on golf courses and other large grounds, and more particularly relates to electrically-driven riding mowers which utilize a bank of batteries for electrical power and, in addition, have an alternative source of electrical power such as a motor-generator set or another bank of batteries.

2. Discussion

The assignee of the present invention recently introduced an all-electric riding greens mower. The mower of this all-electric riding greens mower is described in detail in commonly-assigned co-pending U.S. patent application Ser. No. 08/191,553, filed Feb. 3, 1994, now U.S. Pat. No. 5,406,778, issued Apr. 18, 1995, the disclosure of which is hereby incorporated by reference. The triplex riding mower disclosed in this co-pending application has a bank of batteries supported near the rear of the frame of the riding mower which provides electrical power for operating the main drive electric motor, three reel motors, and three lift motors for raising and lowering the reel type mowing heads as needed. The main motor drives a transaxle that provides a driving force to the two forward wheels of the triplex mower. The three reel mowers each directly drive one of the reels, which may be operated independently. The three lift motors individually drive a screw-type lift mechanism which raises and lowers a head much the same way that conventional hydraulically-powered single-rod cylinders do. The mower includes a foot pedal controlled by the operator which actuates a potentiometer which directs forward or reverse motion of the vehicle at any desired rate of speed, within the limits permitted by the drive motor control circuitry and by the power capabilities of the main motor and batteries. Heavy duty contactors switchably apply electrical energy to the reel motors, which are provided with the full voltage of the battery pack, which is nominally 48 volts obtained by eight 6-volt batteries wired in series.

There are numerous advantages to using an all-electric riding greens mower. These include very quiet operation, because there is no noisy internal combustion engine. Another advantage is the absence of hydraulic devices and accompanying hydraulic oil on the machine, which eliminates the possibility of hydraulic oil leaks. As is known, hydraulic oil leaks in conventional hydraulically-driven and hydraulically-powered turf care equipment can significantly damage a golf green or fairway if undetected by the mower operator.

Another major advantage of the all-electric greens mower is that it does not produce byproducts of combustion, and thus can operate in areas where the use of conventional internal combustion powered mowers is prohibited due to pollution concerns and regulations.

While the disclosed all-electric greens mower is quite satisfactory and much appreciated, it is difficult and impractical to mow large areas, such as fairways or parks with that style of mower, even when appropriate reel-style mowing heads are installed. The range of the battery packs carried by the present mowers remain inherently limited by the power capabilities of conventional batteries.

One challenge presently faced by many golf course operators is that municipalities and communities, especially those which have residential homes bordering the golf courses, restrict by ordinance the hours during which the fairways and greens may be mowed. Homeowners have tired of noisy mowing equipment awakening them during the early morning hours, between 5:00 a.m. and 8:00 a.m., and disturbing them in their leisure during the later evening hours, between 7:00 p.m. and 10:00 p.m., when they expect peace and quiet in their neighborhoods. Golf course operators, on the other hand, dislike mowing their courses during peak golfing times, between 7:00 a.m. and 7:00 p.m. during the golfing season. This challenge presents particular difficulties for golf course owners whose courses are continuously busy, and usually have a waiting list of people seeking tee times.

A sufficiently quiet mower, such as an all-electric mower would allow for mowing fairways and greens on golf courses even where communities have instituted noise-limiting ordinances. This is because the all-electric mowers are very quiet. Unfortunately, the battery range of a riding electric mower with one bank of batteries (even though the battery weight is in excess of 400 pounds) is limited. Battery-powered commercial mowers, therefore, remain impractical for mowing large areas due to the typically extensive recharge times required to fully recharge the battery and the undesirable need to interrupt the mowing process (which the golfers wish to have completed as expeditiously as possible) while the batteries are re-charging.

Therefore, it is a principal object of the present invention to provide an electrically-operated riding mower capable of mowing large areas of turf, such as golf course fairways, soccer fields, parks, and municipal grounds while producing very little noise and minimizing mowing interruptions to re-charge the on-board batteries. A related object is to provide an all-electric riding mower which is capable of being used to mow large areas.

Yet another object of the present invention is to provide an electrically-driven mower which utilizes a motor generator as an electrical energy source which operates in a quiet, highly efficient manner in order to conserve fuel and variably deliver electricity on a demand basis to the electrically-driven mower.

Yet another object is to provide a comparatively light-weight electric mower powered by a motor-generator set. A further object is to provide a hybrid fairway mower which utilizes electric motors for the main drive and the reel-style mower heads, while using electro-hydraulic power for the mower head lift mechanisms and steering.

Yet another object is to provide an extremely quiet, long-life motor-generator set arrangement adapted for use on a fairway mower.

Yet another object is to provide an advanced microcomputer-controlled system for efficiently operating a motor-generator set even when mowing or traveling at different ground speeds.

Yet another object is to provide a microcontroller-based electronic control system for operating electrically-driven riding mowers with multiple-mowing heads.

Yet another object is to provide an electrically-driven mower which conserves the amount of fuel required to operate motor-generator set by operating the motor-generator at substantially peak efficiency at all times.

Still further objects of the present invention are set forth in and will become apparent from the following summary of the invention and the detailed description and claims thereafter.

SUMMARY OF THE INVENTION

In light of the foregoing problems and in order to fulfill one or more of the foregoing objects, there is provided, in accordance with a first aspect of the present invention, a self-propelled riding mower having a frame supported on a plurality of ground engaging wheels. The frame supports a means for mechanically generating electrical energy and further supports a plurality of reel type lawn mowers which are movable between a raised position and a lowered position, in accordance with operation and non-operation, respectively. The reel mowers are driven by electrical motors which receive electrical power from the means for mechanically generating electrical energy. A prime mover having an electric motor is also supplied with electric energy from the means for generating electrical energy, where the prime mover is also adapted to provide torque to one of the ground engaging wheels upon which the frame is supported.

In accordance with a second aspect of the present invention, a self-propelled riding mower includes a frame supported on a plurality of ground engaging wheels. The self-propelled riding mower also includes an internal combustion motor and a device for generating electrical energy in response to mechanical motion provided by the internal combustion motor. A plurality of reel type law mowers are also supported from the frame and are driven by electric motors which receive electrical power from the device for generating electrical energy. Further, a prime mover is adapted to provide driving torque to at least one of the ground engaging wheels and includes an electric motor supplied with electrical energy from the device for generating electrical energy.

In accordance with another aspect of the present invention, a motor generator set which provides electrical energy for operating a self-propelled riding mower. An internal combustion motor and a generator make up the motor generator set, and the generator provides electrical energy in response to mechanical input from the internal combustion motor. The generator provides electrical energy for driving at least one electric motor. The electric motor may be connected to a corresponding reel type lawn mower supported from the riding mower. A voltage regulator modulates the electrical output of the generator within a predetermined range to ensure proper operation of the self-propelled riding mower.

In accordance with yet another aspect of the present invention, a self-propelled riding mower includes a frame supported on a plurality of ground engaging wheels. The mower includes a device for mechanically generating electrical energy and hydraulic pressure generator for receiving hydraulic fluid at an input pressure and providing hydraulic fluid at an output pressure. A drive apparatus powered by the device for mechanically generating electrical energy provides mechanical input to the hydraulic pressure generator. Further, a plurality of reel type lawn mowers are supported from the frame and are moveable between a raised nonoperative position and a lowered operative position in which the reel type lawn mowers engage the ground. The plurality of reel type lawn mowers are driven by electric motors which receive electrical power from the device for generating electrical energy.

In accordance with yet another aspect of the present invention, a self-propelled riding mower includes a frame supported upon a plurality of ground engaging wheels. An internal combustion motor is mechanically connected to a device for generating electrical energy in response to mechanical motion, where the internal combustion motor imparts mechanical motion in order to generate electrical energy. A housing encloses the internal combustion engine and the device for generating electrical energy. Further, the housing includes noise abatement for reducing noise generated within the interior of the housing, thereby reducing noise reaching the exterior of the housing.

In accordance with yet another aspect of the present invention, a self-propelled mower includes a frame supported on a plurality of ground engaging wheels and a motor generator set for generating electrical energy in response to mechanical motion. A housing encloses the motor generator set and includes noise abatement for reducing noise generated within the interior of the housing. The noise abatement includes passive noise abatement implemented as interior and exterior linings of the housing. The self-propelled mower also includes active noise abatement in which an acoustical sensor detects acoustical sound generated within the interior of the housing and outputs a signal varying in accordance with the detected sound. An electronic controller receives as input the signal from the acoustical sensor and determines an output signal which will cancel the noise associated with the input signal. The output signal is input to a speaker which thereby produces the acoustical output to substantially cancel the sound detected by the acoustical sensor.

These and other objects, advantages and aspects of the present invention may be further understood by referring to the detailed description, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various figures, where:

FIG. 4 shows a top view of the FIG. 1 mower adapted to include a hydraulic system to provide drive to at least one of the lift mechanism and the steering mechanisms;

FIGS. 6a and 6b show a detailed block diagram showing a preferred motor generator set arrangement having two types of sound abatement, and a hydraulic steering system connected through an electric clutch;

DETAILED DESCRIPTION OF THE PREFERRED EMBODIMENTS

The present invention is directed to a riding greens mower powered directly by electric power or indirectly by electric power through a hydraulic drive system. For the purpose of providing a detailed description of the preferred embodiments of the invention, the invention is described as embodied as an electric (or electrohydraulic) triplex greens reel mower or a quintplex greens reel mower, each having a frame supported on at least three wheels and the defined number of reel type lawn mowers supported from the frame member, an operator station including a seat from which an operator controls the function of the mower, and an on-board source of electrical energy, such as batteries and/or a motor generator set. It should be readily understood that the teachings of the present invention are not limited to the specific type of mowers described herein and can be extended to a variety of applications in the turf care industry and elsewhere.

Figure 1:
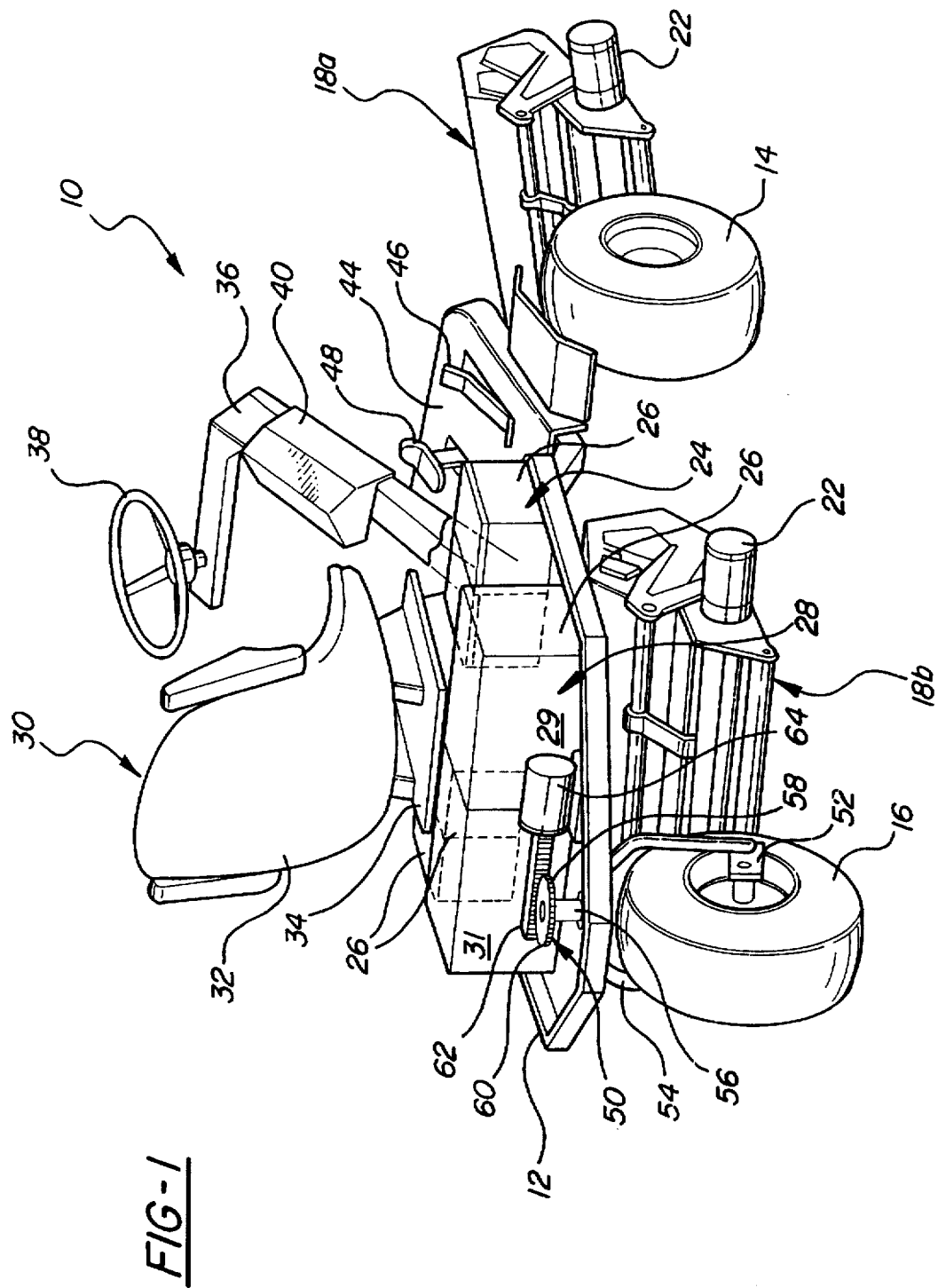
FIG. 1 shows a perspective view of an electrically-driven riding mower of the present invention which has three wheels supporting the frame to which are mounted three mowing heads and lift mechanisms as well as an electric-drive motor and battery pack.

FIG. 1 illustrates a general arrangement of the electric turf mower 10 with a motor generator set. Mower 10 includes a frame 12 supported for movement on forward drive wheels 14 and steerable rear wheel 16. Three reel lawn mowers 18a and 18b (the third mower not shown) are supported from frame 12 by reel lift assemblies (not shown in FIG. 1). Reel lawn mower 18a is disposed at the right forward corner of frame 12, and reel lawn mower 18b is substantially disposed below frame 12. This arrangement assures that the mowers precede the ground engaging wheels such that the turf (particularly on a golf green) is mowed prior to being traversed by the ground engaging wheels, thereby ensuring a precise and consistent length of cut.

Each of the reel lawn mowers are driven by an electric reel motor 22, which is supplied with electrical energy from an on-board battery power source 24. Battery power source 24 preferably provides between 12 volts to 96 volts of electrical energy. In the preferred embodiment, battery power source 24 includes eight six-volt lead-acid batteries 26 connected in series to provide 48 volts of electrical energy. As will be appreciated, lower battery voltages may be used with smaller units while higher battery voltage may be used with larger units, such as the five gang fairway mower described with respect to FIG. 2. Battery power source 24 is rechargeable and it should be readily understood that any type of batteries, such as the above-mentioned lead-acid or nickel cadmium (NiCad) batteries may be used with mower 10. Battery power source 24 also provides electrical energy to a drive motor or primary mover (not shown) which is adapted to provide driving torque through a driving axle (not shown) to each of the forward drive wheels 14 for propelling mower 10 over the mowing surface.

A motor generator set 28 provides a second source of power to charge the battery power source 24 and to provide electrical energy for driving the mower 10. The motor generator set 28 includes an internal combustion motor 29 which provides mechanical input to generator 31. The generator 31 converts the mechanical energy input from internal combustion motor 29 into electrical energy output to the battery power source 24 and to the electrical components of mower 10. Motor generator set 28 may be any of a number of typical motor generator sets well known in the art.

Mower 10 is operated from an operator station 30, which includes a seat 32 supported above frame 12 and battery power source 24 by seat support 34. Operator station 30 also includes a control support arm 36 which is secured to a rearward portion of the frame 12. Control support arm 36 extends forwardly and around the seat 32 such that a steering wheel 38 is located directly in front of the operator and a control module 40 for housing control elements such as control switches and indicators is within view and reach of the operator. Located on control support arm 36 and adjacent to steering wheel 38 may be a communication panel which is operable for displaying mowing and operating instructions to the operator. Formed integral to frame 12 and associated with operator station 30 is a foot deck 44. Foot deck 44 is ergonomically angled for operator comfort and ease of reaching the drive pedal 46, brake pedal 48, and the reel mower activation switch (not shown in FIG. 1). Seat 32 further may also include an assist handle for assisting the operator on and off the mower 10.

Mower 10 also includes a steering mechanism 50 for rotating steerable rear wheel 16 of mower 10. Steerable rear wheel 16 is mounted to a pair of brackets 52 secured to a U-shaped yoke member 54. U-shaped yoke member 54 includes an upper spindle 56 which is journally supported within a sleeve which is in turn secured to frame 12. Spindle 56 projects upwardly through frame 12 allowing for a steering sprocket 58 to be secured thereto. Steering sprocket 58 has a plurality of teeth 60 formed along its circumference for engaging a plurality of complimentary teeth formed in a shaft 62 projecting from a steering motor 64 secured to the frame 12. Steering motor 64 controls the projection and retraction of shaft 62 which, through engagement of teeth 60 induces rotation of steering sprocket 58, thereby causes rotation of steerable rear wheel 16. In an alternative configuration steering motor 64 may be a self contained hydraulic cylinder which controls the projection and retraction of shaft 62. The self contained hydraulic cylinder 64 includes a hydraulic pump, such as a gear pump, which operates in two directions to control projection and retraction of the hydraulic cylinder portion of steering motor 64. An electric motor drives the hydraulic pump to modulate the hydraulic fluid pressure and control extension and retraction of the cylinder. Steering motor 64 typically is an electrically or hydraulically actuated device which receives control commands from an electronic (or hydraulic) controller to cause projection or retraction of shaft 62.

Figure 2:
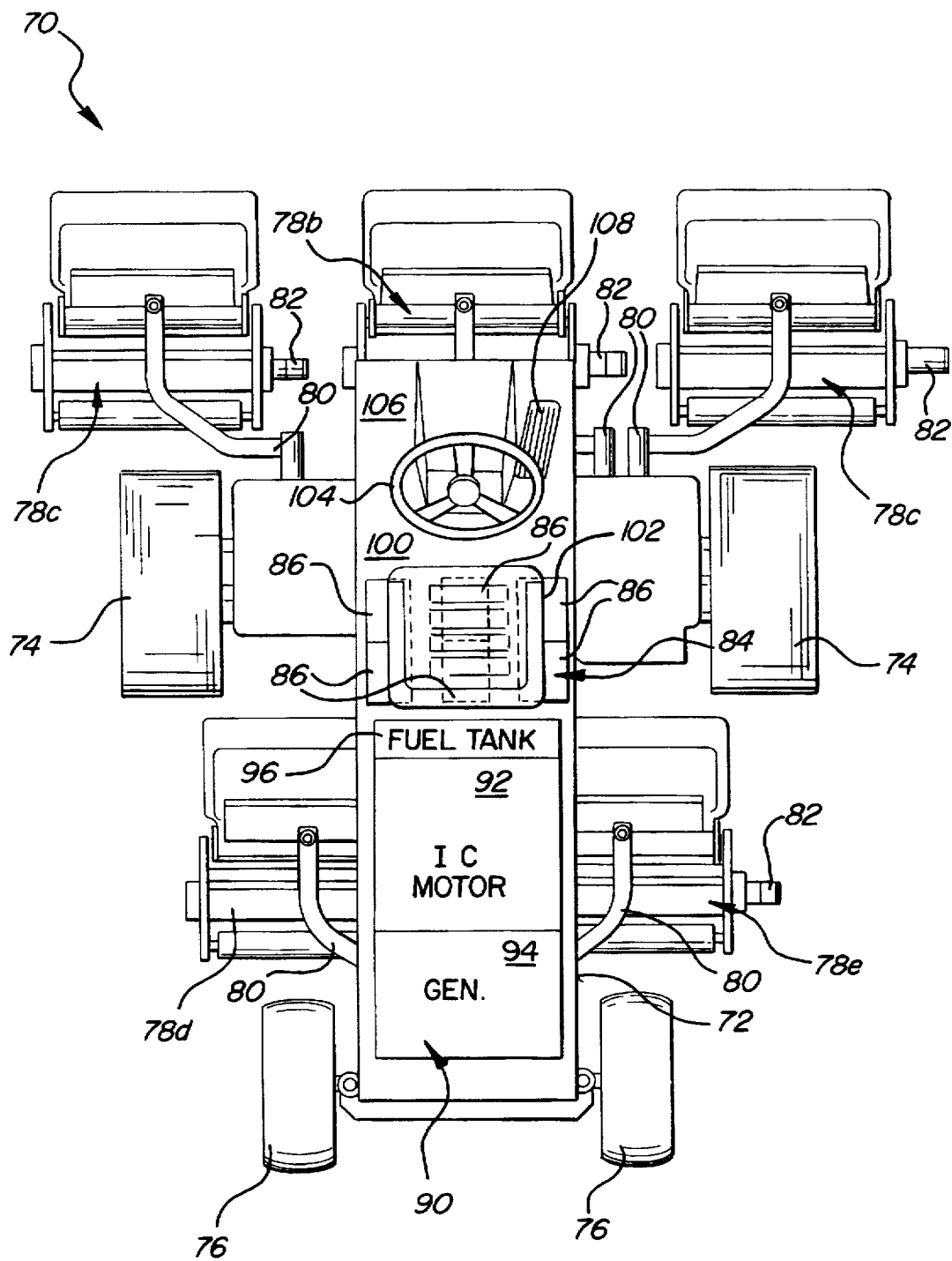
FIG. 2 shows a top view of five-gang riding mower powered by an on-board battery pack and a motor generator set.

FIG. 2 illustrates a five gang mower 70 which defines a second embodiment of the present invention and is directed primarily for mowing wider strips of turf than the mower 10 of FIG. 1. An example of such a five gang mower 70 may be found with reference to a typical golf course fairway mower. Mower 70 includes a frame 72 supported for movement on drive wheels 74 and steerable rear wheels 76. Five reel type lawn mowers 78a, 78b, 78c, 78d, and 78e are supported from frame 72 by reel lift assemblies 80. Three of the reel type lawn mowers 78a, 78b, and 78c are disposed forward of drive wheels 74, and two reel lawn mowers 18d and 18e are disposed between drive wheels 74 and steerable rear wheels 76. This arrangement assures that the mowers precede the drive wheels 74 and 76 so that the fairway turf is mowed prior to traversal by the ground engaging wheels, thereby ensuring a more precise and consistent length of cut. Each of the reel lawn mowers 78a–e are driven by an electric reel mower motor 82 which is supplied with electrical energy from on-board battery power source 84. As described above with respect to FIG. 1, battery power source 84 preferably provides between 12 volts and 96 volts of electrical energy. In a preferred embodiment, battery power source 84 includes eight six-volt lead-acid batteries 86 connected in series to provide 48 volts of electrical force. Such capacity provides the capability for cutting approximately 2 average golf course fairways, including transportation of mower 10 between the fairways. As described above and as will be appreciated, lower battery voltages may be used with smaller units while higher battery voltages may be used with larger units. Battery power source 84 is rechargeable and it should be readily understood that any type of batteries, such as the above-mentioned lead-acid or nickel cadmium (NiCad) batteries may be used with mower 70.

Battery power source 84 also provides electrical energy to a drive motor or primary mover (not shown in FIG. 2) which is adapted to provide driving torque through a driving axle (also not shown in FIG. 2) to each of drive wheels 74 for propelling mower 70 over the fairway being mowed. The drive motor is capable of providing an average cutting speed for mower 70 of approximately 7 miles per hour (MPH) during mowing operations and approximately 15 MPH during transport.

Mower 70 also includes a motor generator set 90 comprising an internal combustion (IC) motor 92 for providing mechanical drive to a generator 94. Mechanically driving generator 94 produces electrical energy applied to both battery power source 84 and the drive motor and other electrical devices in accordance with the electrical power needs of mower 70. A fuel tank 96 stores fuel for driving internal combustion motor 92.

Also as described with respect to the mower 10 of FIG. 1, mower 70 is operated from an operator station 100 which includes a seat 102 supported above frame 72 and battery power source 84 by a seat support (not shown). Operator station 100 also includes a steering wheel 104 located directly in front of the operator and a control module (not shown) for housing the control elements, such as control switches and indicators, within the view and reach of the operator. Formed integral to the frame 12 and associated with operator station 100 is a foot deck 106. Foot deck 106 is ergonomically angled for operator comfort and ease of reaching the drive pedal 108 and other associated pedals, such as the brake pedal and mow switch (not shown).

In operation, the motor generator set 28 (and 90) of FIG. 1 (and 2) outputs electrical energy which both charges the battery power sources 24 (and 84) and operates the drive motor and other electrical devices. The internal combustion motor 29 (and 92) outputs mechanical energy, typically through an output shaft (not shown) to the generator 31 (and 94). The generator 31 (and 94) converts the mechanical energy input from internal combustion motor 29 (and 92) into electrical energy and delivers electrical energy at a predetermined frequency or voltage, either of which may vary depending upon the particular configuration of the motor generator set.

Figure 3A:
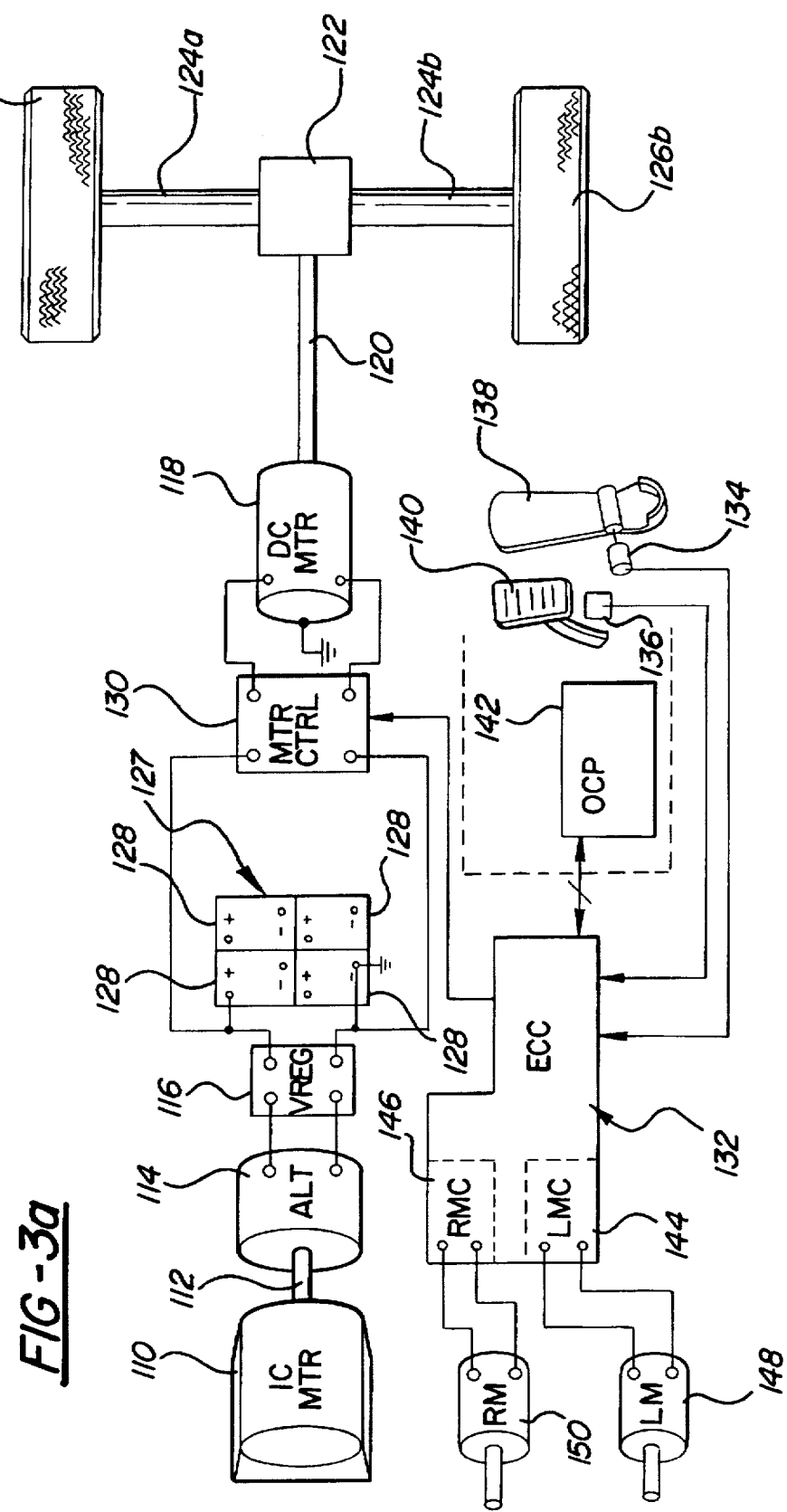
FIG. 3a is a block diagram for an electrically-driven mower which uses an DC drive motor.
Figure 3B:
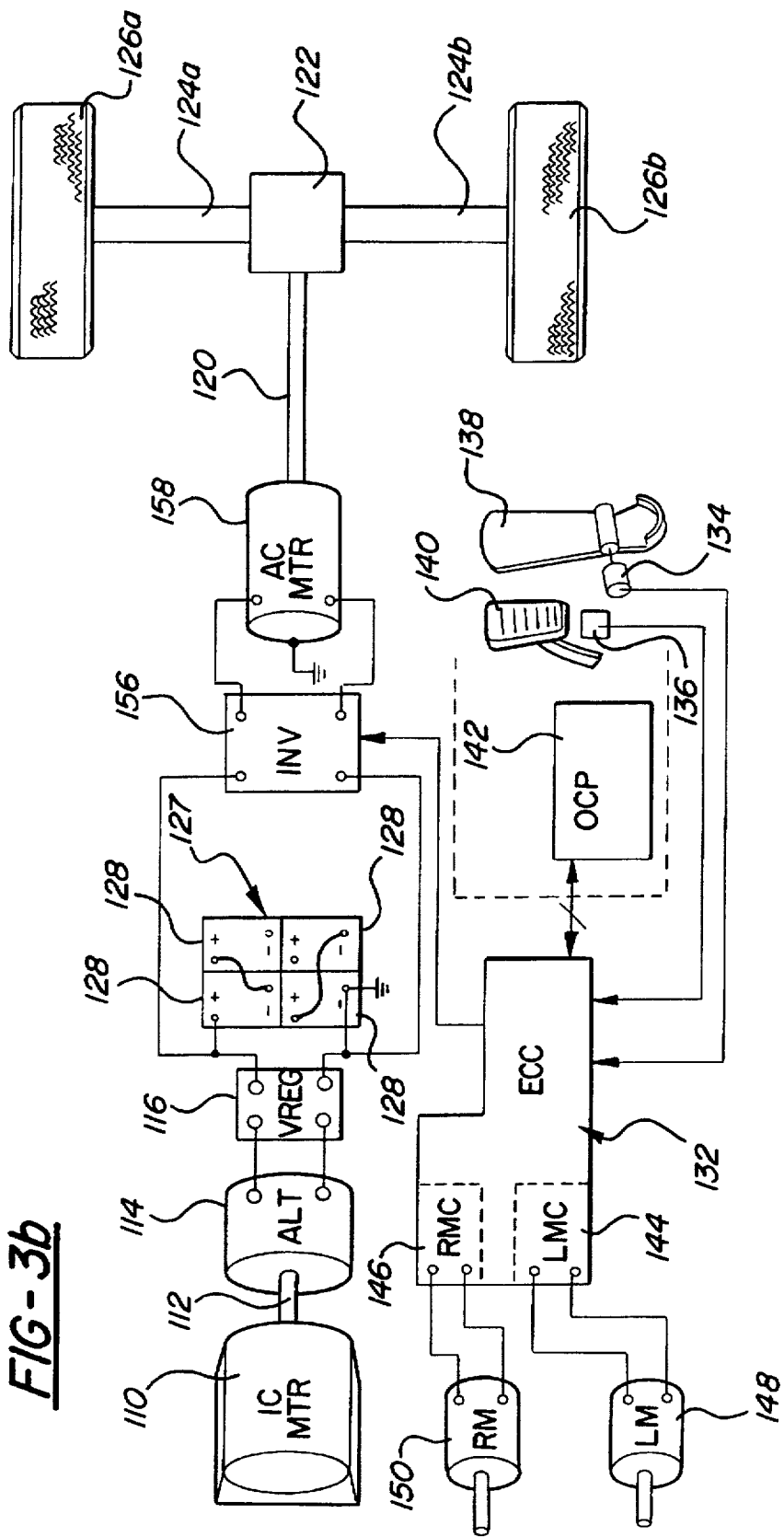
FIG. 3b is a block diagram for an electrically-driven mower which uses a AC drive motor.

FIGS. 3a and 3b depict a typical configuration for the electrical drive system of the mowers of FIG. 1 (and 2) for operating the main drive motor. The motor generator configurations of FIGS. 3a and 3b will be described generally with equal reference to FIGS. 1 and 2. One skilled in the art will readily recognize that either configuration may be readily adapted for operation on either of the mowers in FIGS. 1 and 2. An internal combustion motor 110 provides mechanical energy via an output shaft 112 to an alternator 114. The output shaft 112 causes rotation of the rotor (not shown) of the alternator 114, thereby resulting in the alternator 114 producing electrical energy for output to a voltage regulator 116. In the particular configuration of FIG. 3a, the drive motor is represented as a direct current (DC) motor 118 which converts DC voltage into rotational motion applied to an output shaft 120. Output shaft 120 is input into a transmission 122 which converts the mechanical energy provided by output shaft 120 into torque for driving the left and right axles 124a and 124b, respectively, to cause the drive wheels 126a and 126b to rotate, respectively. Because motor 118 is a DC motor, the combination of alternator 114 and voltage regulator 116 provides a DC voltage signal to DC motor 118. The output of voltage regulator 116 also is input to a battery pack 127 which comprises a plurality of batteries 128 connected in series so that the combined series connection of the batteries 128 results in an output voltage sufficient for operation of DC motor 118.

A motor controller 130 receives the output voltage provided by voltage regulator 116 and battery pack 127 and modulates the voltage input to DC motor 118. In this manner, motor controller 130 modulates the output of DC motor 118 by modulating the voltage input to DC motor 118. Motor controller 130 operates in conjunction with an electronic control circuit 132, which determines the desired mower speed and modulates the output of DC motor 118 and outputs a control signal to motor controller 130 in order to vary the output of DC motor 118. Electronic control circuit 132 receives input signals through a pair of potentiometers 134 and 136 which are controlled by operator foot pedals 138 and 140, respectively. When the operator (not shown) presses operator foot pedal 138 (the drive pedal), a change in the position of potentiometer 134 results in a variation of the signal input to electronic control circuit 132. Similarly, when the operator depresses operator foot pedal 140 (the brake pedal), a change in the position of potentiometer 136 results in a variation of the signal input to electronic control circuit 132. Electronic control circuit 132 determines the desired output of DC motor 118 in accordance with the input signals and generates a control signal input to motor controller 130. Motor controller 130 in turn varies the output voltage applied to DC motor 118 in accordance with the received control signal.

Electronic control circuit 132 also receives input from operator control panel 142, which is analogous to the operator control panels mentioned with respect to FIGS. 1 and 2. Electronic control circuit 132 thus provides additional control for other mower control functions. For example, electronic control circuit 132 may also include a left motor controller 144 and a right motor controller 146 which operate left motor 148 and right motor 150, respectively. The electronic control circuit 132 receives input from operator control panel 142 and generates control signals input to left motor controller 144 and right motor controller 146. The respective controllers then generate the desired signals for carrying out the operations indicated in accordance with input from the operator control panel 142. Examples of such controlled functions include reel mower positions (raised or lowered) and reel mower speed. Left motor 148 and right motor 150, in addition to receiving control signals from left motor controller 144 and right motor controller 146, receive driving electrical energy from a combination of the output of battery pack 127 or voltage regulator 116.

It will be understood by those skilled in the art that various modifications of FIG. 3a may result in various alternative control systems. For example, if voltage regulator 116 is a variable voltage regulator, electronic control circuit 132 could alternatively provide a control signal directly to voltage regulator 116. Voltage regulator 116 could then output a driving voltage directly to DC motor 118, thereby eliminating the need for motor controller 130. Voltage regulator 116 could additionally provide a separate charging voltage directly to battery pack 127 as well.

FIG. 3b depicts an alternative configuration for providing driving energy to the primary mover of the mowers of FIGS. 1 and 2. Like components of FIGS. 3a and 3b have been described with respect to FIG. 3a and will not be described with respect to FIG. 3b. In this alternative configuration, an AC motor 158, rather than a DC motor, functions as the primary mover. In operation, the electrical power system of FIG. 3b operates similarly to that described in FIG. 3a. The output from voltage regulator 116 remains a DC voltage which provides charging electrical energy to battery pack 127. Voltage regulator 116 also outputs a DC voltage to inverter 156. Inverter 156 converts the DC voltage signal to an AC voltage signal which is applied to AC motor 158. AC motor 158 is powered by an AC signal and provides a driving torque to output shaft 120.

Figure 3C:
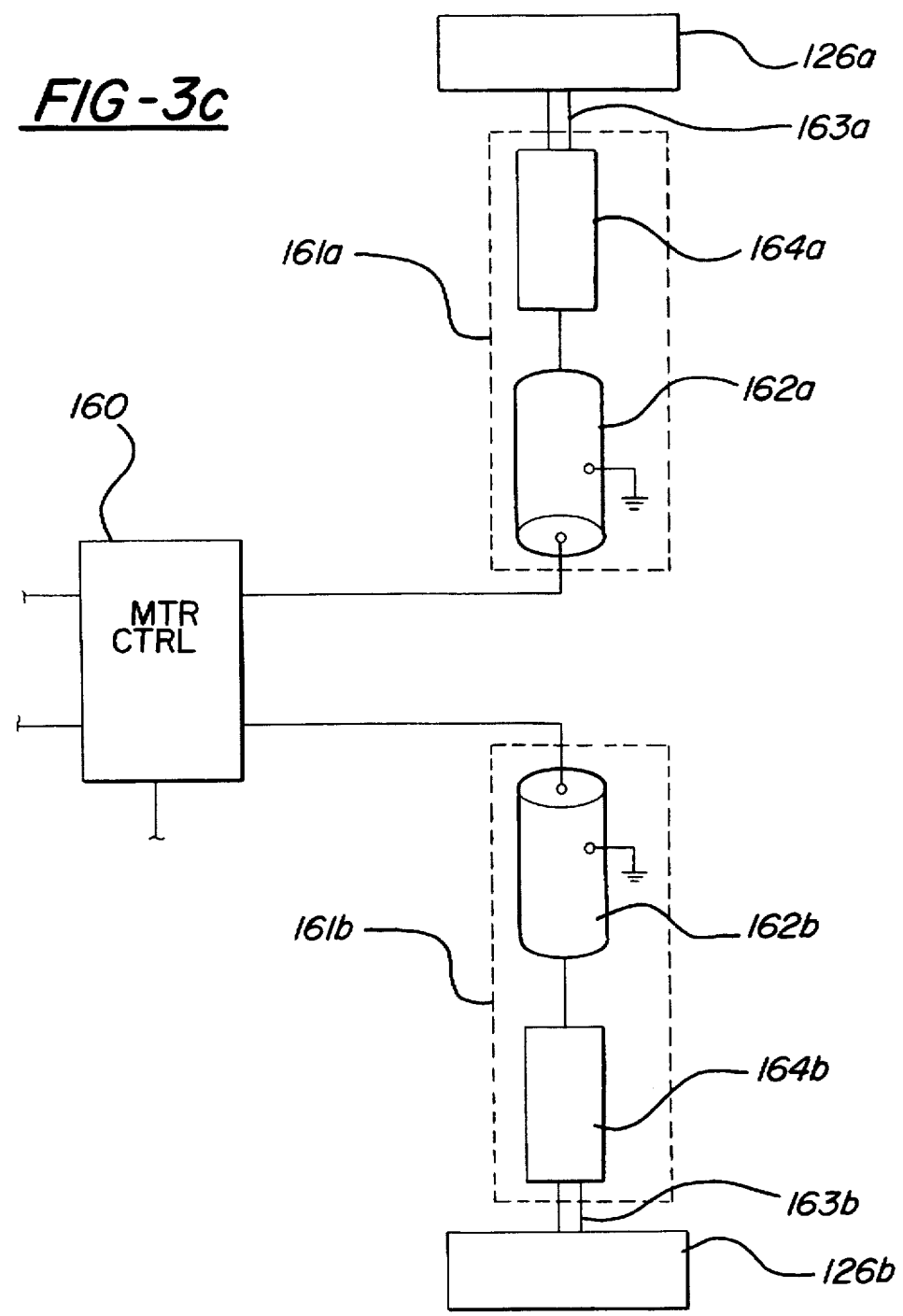
FIG. 3c is a block diagram of a dual motor, gear wheel direct drive system to individually power the drive wheels of the turf mower.

In yet another embodiment for providing driving torque to the drive wheels 126a and 126b, FIG. 3c depicts a dual motor drive system for providing torque to the drive wheels 126a and 126b. Motor controller 160 receives electrical power supplied by the combined motor generator set and battery packs as described with respect to FIGS. 3a and 3b, depending upon the particular configuration of the drive motor. Motor controller 160 also receives a signal from electronic control circuit for directing the output of motor controller 160. Motor controller 160 provides electrical control signals to each of a right drive motor 162a and a left drive motor 162b. Each control signal output to the respective motors 162a and 162b directs operation of that particular motor. The motors 162a and 162b each provide a driving output to gear reducers 164a and 164b, respectively. The gear reducer sets 164a and 164b reduce the rotational speed of the motors 162a and 162b respectively, from a relatively high revolution per minute (RPM) rate to a substantially lower RPM rate suitable for the drive wheels 126a and 126b. Thus, each drive wheel 126a and 126b is individually driven by the respective gear motor arrangements provided by the motor 162 and gear reducer 164.

The motor and associated gear reducer 162a and 164a for the right drive wheel and 162b and 164b for the left drive wheel may be combined into a single integrated unit 161a and 161b. The integrated gear wheels motors 161a and 161b may also form an axle which attaches to the frame (12 of FIG. 1) at one end and the wheel hub via an output shaft 163a and 163b at the other end. This configuration thus provides an integral wheel hub which attaches directly to the vehicle frame and supports the vehicle frame above the drive wheels 126a and 126b.

Figure 3D:
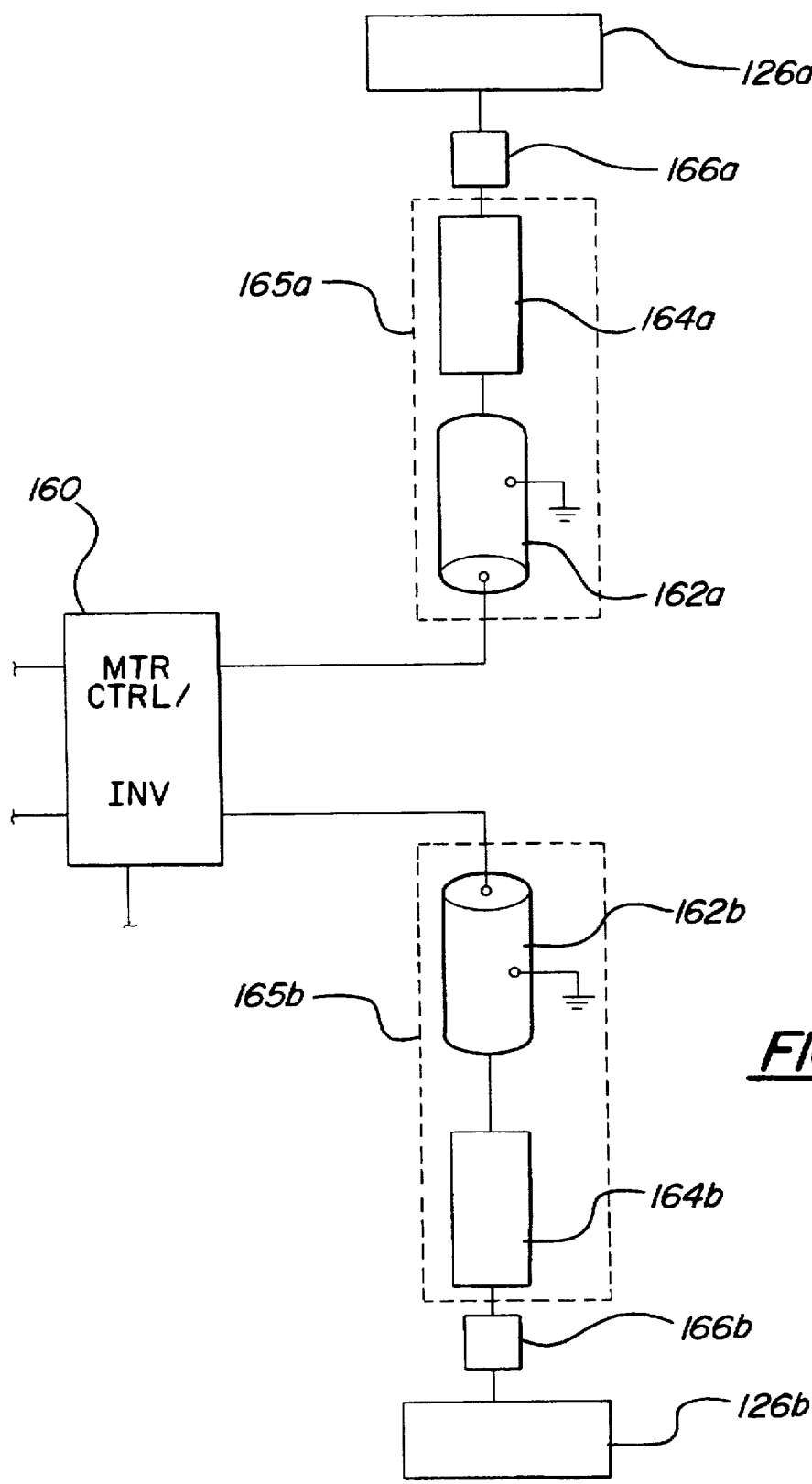
FIG. 3d is a block diagram of a dual motor chain drive system to individually power the drive wheels of the mower.

FIG. 3d depicts yet another configuration for dual motor drive system which employ a gear wheel motor configuration. Note that like elements from FIG. 3c will be similarly referenced in FIG. 3d and the description of FIG. 3 applies equally to said same elements of FIG. 3d. Thus, the motor controller 160 receives both driving electrical signals and control signals from the motor generator set/battery pack combination and the electronic control circuit, respectively. The motor controller 160 outputs control signals to right drive motor 162a and left drive motor 162b. Right drive motor 162a and left drive motor 162b in turn provide driving torque to gear reducer sets 164a and 164b, respectively. In the embodiment of FIG. 3d, the gear reducer sets 164a and 164b provide torque to chain drive systems 166a and 166b. Chain drives 166a and 166b typically include input sprockets driven by gear reducer sets 164a and 164b and also include output sprockets which typically rotates in association with each of drive wheels 126a and 126b, respectively. Thus, in operation, motor controller 160 provides control signals to each of drive motors 162a and 162b. Drive motors 162a and 162b provide output torque to gear reduction sets 164a and 164b, respectively. The gear reducer sets 164a and 164b in turn provide output torque to chain drives 166a and 166b, which imparts rotational motion to drive wheels 126a and 126b, respectively. In an alternative embodiment, the drive motors 162 and gear reducer sets 164 may be combined into an integral drive motor and gear reducer system 165a and 165b. In a further variation, the chain drive systems 166a and 166b may be configured to provide a gear ratio which eliminates the need for gear reducing sets 164a and 164b. Further, the motors in the gear reducer systems described above preferably output 4 to 6 kilowatts of power, and the desired gear ratio varies, but is preferably in the range of 6:1 to 18:1.

In an alternative configuration to the triplex gang mower 10 shown in FIG. 1, FIG. 4 depicts a triplex electrohydraulic mower 170 in which, the reel motors, the lift mechanisms and the steering system are hydraulically operated by a hydraulic system. The hydraulic system includes an electrically or mechanically driven pump which may be driven by an electric motor powered by either of the battery pack or the motor generator set. In the alternative, the hydraulic pump may be mechanically driven by the internal combustion motor of the motor-generator in a direct drive configuration.

The triplex, gang electrohydraulic mower 170 includes a frame 172 supported for movement on forward drive wheels 174 and steerable rear wheel 176. Three reel type lawn mowers 178a, 178b, (and a third reel type mower not shown, but disposed beneath the frame) are supported from the frame 172 by reel lift assemblies 180a and 180b, respectively. Reel lawn mower 178a is disposed at the right forward corner of frame 172, and reel lawn mower 178b is disposed at the left front corner of frame 172. The third reel lawn mower is essentially disposed below frame 172. As described with respect to FIG. 1, this arrangement ensures that the mowers precede the ground engaging wheels such that the turf is mowed prior to being traversed by the ground engaging wheels, thereby ensuring a precise and consistent length of cut. Each of the reel lawn mowers are driven by a hydraulic (or optionally an electric) reel motor 182a, 182b, (and a third motor not shown), respectively.

Hydraulic lines 184 supply hydraulic fluid to the hydraulic reel motors 182a and 184b and the lift assembly 180a. A hydraulic pump 186 supplies hydraulic fluid at a pressure via hydraulic lines 184. The hydraulic pump 186 receives hydraulic fluid from a hydraulic fluid tank reservoir 190 and applies hydraulic fluid at an output pressure to the motors 182 and reel lift assemblies 180a and 180b at a pressure sufficient to drive the respective devices. Hydraulic pump 186 may be driven by one or a combination of an electric motor or through direct drive from the internal combustion motor 192 of a motor generator set 194. Lift assembly 180b demonstrates an alternative configuration for the lift assemblies for mower 170 in which a self contained electrohydraulic assembly includes an electric motor, a hydraulic pump, a cylinder, and a reservoir and receives electrical control signals to direct the raising and lowering of reel lawn mower 178b. The assembly operates similarly to the electrohydraulic steering motor 65 of FIG. 1. A bi-directional electric motor 181 drives a bi-directional, hydraulic pump 183, such as a two way gear pump, through a gear reduction set. The hydraulic pump 183 receives hydraulic fluid from the reservoir 185 and outputs a hydraulic fluid pressure to displace the hydraulic cylinder 187. Displacement of the hydraulic cylinder raises and lowers reel lawn mower 178b. It should be noted that the configuration of reel lift assembly 180b may be implemented each of the reel lift assemblies.

In the electric motor arrangement, hydraulic pump 186 may be driven by an electric motor which is supplied with electrical energy from an on-board battery power source 196 or the motor generator set 194. Battery power source 196 preferably provides between 12 volts to 96 volts of electrical energy. In a preferred embodiment, battery power source 196 includes eight six-volt lead-acid batteries 198 connected in series to provide 48 volts of electrical energy. As will be appreciated, lower battery voltages may be used with smaller units while higher battery voltages may be used with larger units such as the fairway mower described with respect to FIG. 5. Battery power source 196 is rechargeable and it should be readily understood that any type of batteries, such as the above-mentioned lead-acid or nickel cadmium (NiCad) batteries may be used with electrohydraulic mower 170. Battery power source 196 also may optionally provide electrical energy to a primary mower or drive motor (not shown) which is adapted to provide driving torque through a driving axle (not shown) to each of the drive wheels 174 for propelling electrohydraulic mower 170 over the mowing surface.

Electrohydraulic mower 170 is operated from an operator station 200 which includes a seat 202 supported above frame 172 and battery power source 196 by a seat support (not shown). Operator station 200 also includes a control support arm 204 which is secured to a rearward portion of the frame 172. Control support arm 204 extends rearwardly and around the seat 202 such that a steering wheel 206 is located directly in front of the operator such that a control module 208 for housing the control elements such as control switches and indicators is within view and reach of the operator. Located on control support arm 204 and adjacent to steering wheel 206 is a communication panel 210. Formed integral to frame 172 and associated with operator station 200 is a foot deck 212. Foot deck 212 is ergonomically angled for operator comfort and ease of reaching the drive pedal 214, brake pedal 216, and the reel mower activation switch 218. Seat 202 also includes an assist handle (not shown) for assisting the operator on and off the mower. Electrohydraulic mower 170 also includes a steering mechanism for rotating steerable rear wheel 176 of electrohydraulic mower 170. The rear wheel steering mechanism operates as described with respect to FIG. 1 with the additional feature that the motor 220 which controls extension and retraction of the shaft 222 is a hydraulically operated motor. Motor 220 receives hydraulic fluid at pressure provided by hydraulic pump 186 and operates in two directions so as to cause extension and retraction of shaft 222.

Referring back to the motor generator set 194, the motor generator set 194 operates substantially as described with respect to FIG. 1. Motor generator set 194 includes an internal combustion motor 192 which provides mechanical input to generator 193. The mechanical input to generator 193 results in the output of electrical energy supplied to battery power source 196 and supplied to various electric motors, including steering motors, and primary mover motors. Internal combustion motor 192 also optionally drives hydraulic pump 186 which provides mechanical energy for the pressurization of hydraulic fluid by hydraulic pump 186. Internal combustion motor 192 is powered by a fuel source stored in fuel tank 195. The motor generator set 194 may also provide electrical energy to the primary mower in the same manner as described with respect to FIGS. 3a and 3b.

Figure 5:
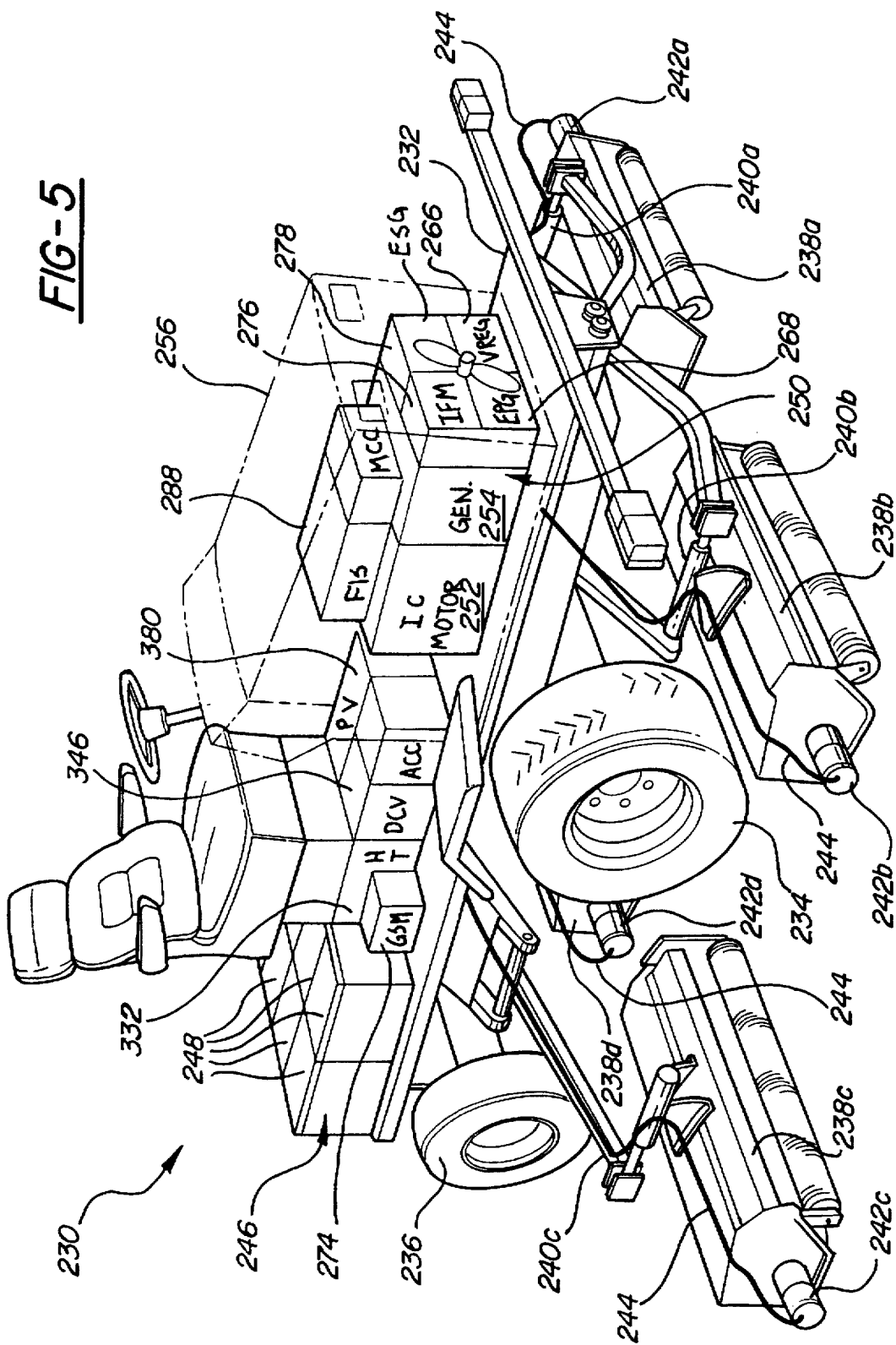
FIG. 5 shows a perspective view of a five-gang riding mower powered by an on-board battery pack and motor generator set combination to power electric and hydraulic drive systems to operate the mower.

FIG. 5 illustrates a similarly configured apparatus to that of FIG. 4 implemented as a five gang electrohydraulic mower 230. Electrohydraulic mower 230 is implemented as a five gang, electrohydraulic mower in which mechanical energy is derived from a combination of electric drive and hydraulic drive. A battery pack or power source, to be described further herein, provides the electrical energy to power the electrically controlled devices. Similarly, a hydraulic motor which provides pressurized hydraulic fluid to drive the hydraulically actuated devices may be driven by one or a combination of an electric motor and an internal combustion engine of a motor generator set, to be described further herein. The five gang electrohydraulic mower 230 corresponds primarily to a device for mowing wider strips of turf than the mower depicted in FIG. 4. An example of such a five gang mower may be found with respect to a typical golf course fairway mower. Electrohydraulic mower 230 includes a frame 232 supported for movement on forward drive wheels 234 and steerable rear wheels 236. Five reel type lawn mowers 238a, 238b, 238c, and 238d (shown partially and the fifth reel lawn mower not shown) are supported from frame 232 by reel lift assemblies 240a, 240b, 240c and 240d (the fifth reel lift assembly not shown), respectively. In an embodiment depicted in FIG. 5, two of the reel type lawn mowers 238a and 238b are disposed forward of forward drive wheels 234, and two reel lawn mowers 238c and 238d are disposed forward of steerable rear wheels 236. This arrangement ensures that the mowers proceed the wheels 234 and 236 so that the fairway turf is mowed prior to traversal by the ground engaging wheels. This ensures a more precise and consistent length of cut.

Each of the reel lawn mowers 238a, 238b, 238c, and 238d are driven by reel mower motors 242a, 242b, 242c, 242d (and a fifth mower motor not shown) respectively. Each of the mower motors 242a, 242b, 242c, and 242d may be hydraulically powered in a first configuration or electrically powered in a second configuration. In the hydraulic configuration the motors are driven by hydraulic fluid supplied at pressure via hydraulic lines 244. A hydraulic pump (not shown in FIG. 5, but to be described further herein) provides hydraulic fluid at pressure to each of the respective hydraulic mower motors via hydraulic lines 244. In the electrically operated configuration, electrical energy drives the respective mower motors which impart mechanical drive to the reel mowers.

A battery power source 246 preferably provides 12 volts to 96 volts of electrical energy. In a preferred embodiment, battery power source 246 includes eight six-volt lead-acid batteries 248 connected in series to provide 48 volts of electrical force and further providing a capability of cutting approximately two average golf course fairways, including transportation of electrohydraulic mower 230 between the fairways. As described above, as will be appreciated, lower battery voltages may be used with smaller units while higher battery voltages may be used with larger units. Battery power source 246 is a rechargeable battery power source, and it will be understood by one skilled in the art that any type of batteries, such as the above-mentioned lead-acid or nickel cadmium (NiCad) batteries may be used with electrohydraulic mower 70. Battery power source 246 may optionally provide electrical energy to drive an electric motor which functions as a prime mover and an electric motor which functions as a hydraulic pump to supply fluided pressure for driving the hydraulically actuated devices.

Electrohydraulic mower 230 also includes a motor generator set 250 comprising an internal combustion motor 252 providing mechanical input to a generator 254. The mechanical input provided by the internal combustion motor 252 causes generator 254 to output electrical energy. The electrical energy provided by generator 254 may be used to power any of the electric motors and to charge the battery power source 246. Electrohydraulic mower 230 also includes a housing 256 for housing the motor generator set 250. Housing 256 preferably includes sound insulation capabilities so as to significantly reduce the sound emanating from the electrohydraulic mower 230. Such sound reduction renders the electrohydraulic mower 230 particularly attractive for use on golf courses located in and around residential communities. The reduction in noise significantly reduces the interruptions experienced by those living on or near the golf course due to the noise of the typical fairway mower.

Figure 6A:
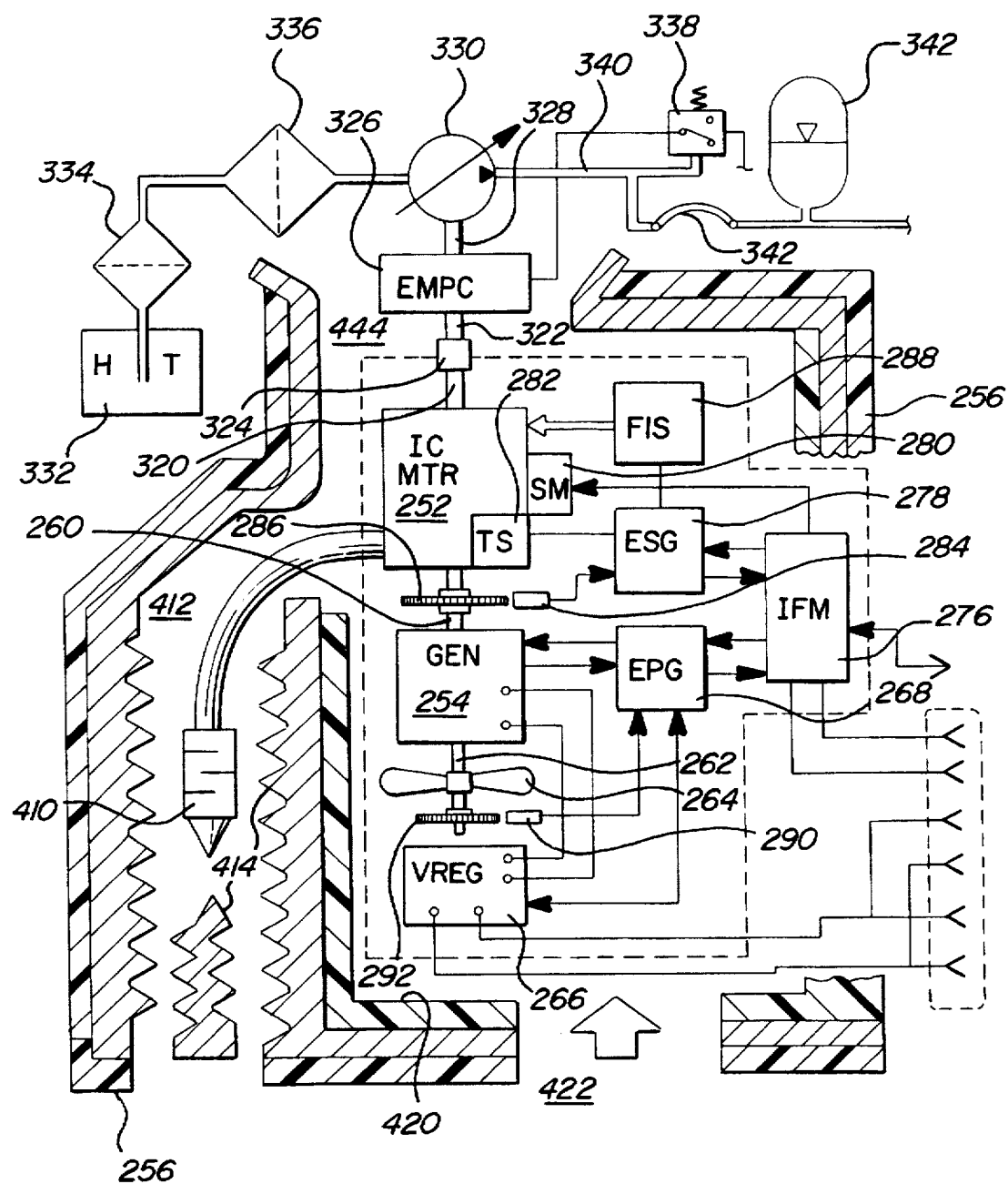

Referring to FIG. 5 in conjunction with FIGS. 6a and 6b, the electrohydraulic control system of electrohydraulic mower 230 will be described. FIGS. 6 a and 6b depict a block diagram of the control system for both the combines electronic and hydraulic aspects of the control system. Regarding the electronic control system, electrical energy to drive the electric turf mower is stored in electrical storage batteries 248 which are connected in series by a plurality of jumpers to define a battery power source 246. The battery power source 246 of the present invention is preferably rechargeable, and motor generator set 250 supplies electrical energy sufficient to recharge battery power source 246 and operated electrohydraulic mower 230. The motor generator set 250 includes an internal combustion motor 252 which provides mechanical output on an output shaft 260 to a generator 254. In the block diagram of FIGS. 6a and 6b, note that generator 254 is depicted as a direct current (DC) voltage output device, but may output an alternating current (AC) signal as well. The internal combustion motor 252 also provides mechanical input through generator 254 to drive a second output shaft 262 which is attached to a fan 264. Rotation of output shaft 262 in turn causes rotation of fan 264 thereby providing an airflow to maintain a relatively low operating temperature within the housing 256 of the electrohydraulic mower 230. Generator 254 outputs a DC voltage to voltage regulator 266. Voltage regulator 266 modulates the input voltage received from generator 254 and outputs a voltage which may be varied in accordance with a control signal supplied by electronic power governor 268. Thus, electronic power governor 268 receives a sample voltage from voltage regulator 266 and returns a voltage control signal to voltage regulator 266 to vary the output thereof.

The output from voltage regulator 266 is selectively input to battery power source 246. Selective output of the voltage from voltage regulator 266 to battery power source 246 is controlled through a pair of contactors 270 and 272. The contactors 270 and 272 are in turn controlled by a gen set monitor 274. Gen set monitor 274 is an electronic control module which monitors the voltage output by voltage regulator 266. Depending on the voltage level output by voltage regulator 266, gen set monitor 274 selectively actuates contactors 270 and 272 to enable and disable application of voltage output by voltage regulator 266 to battery power source 246. Gen set monitor 274 determines actuation of contactors 270 and 272 in accordance with the voltage output by voltage regulator 266 and the voltage output of battery power source 246. Gen set monitor 274 first determines that the output from voltage regulator 266 can sufficiently charge battery power source 246 prior to actuating contactors 270 and 272. If the voltage output from voltage regulator 266 can sufficiently charge battery power source 246, gen set monitor 274 then determines the output of battery power source 246. When the output of battery power source 246 drops below a predetermined threshold, gen set monitor 274 actuates contactors 270 and 272 to allow application of the output from voltage regulator 266 to battery power source 246, thereby charging each of the respective batteries 248 of battery power source 246.

Gen set monitor 274 also exchanges control information with interface module (IFM) 276. Interface module 276 provides status information to gen set monitor 274, and gen set monitor 274 returns control signals to interface module 276. Interface module 276 receives control signals from gen set monitor 274 and outputs the appropriate control signals to engine speed governor (ESG) 278, electronic power governor (EPG) 268, and starter motor (SM) 280. In operation, interface module 276 receives the control signal from gen set monitor 274 and generates the corresponding appropriate control signal for each of electronic power governor 268, electronic speed governor 278, and starter motor 280.

With respect to electronic speed governor 278, electronic speed governor 278 receives a temperature signal from temperature switch 282 and a speed signal from speed sensor 284. Speed sensor 284 is an electromagnetic pickup which gene rates a frequency signal in response to passage of the individual teeth of wheel 286. The frequency of the signal output by speed sensor 284 determines the speed of the output shaft 260 of internal combustion motor 252. Status information related to the operation of the electronic speed governor 278 is relayed from the electronic speed governor 278 to gen set monitor 274 through interface module 276. Gen set monitor 274 then generates the appropriate control signals sent to electronic speed governor 278 thorough interface module 276. In response to the particular control signals, electronic speed governor 278 outputs control signals to fuel injection system (FIS) 288. Fuel injection system 288 generates the appropriate control signals for operating the fuel injectors (or carburetor) of internal combustion motor 252 to obtain the desired operation of internal combustion motor 252. The fuel injection system 288 th us varies the output speed of internal combustion motor 252.

Similarly, electronic power governor 268 receives voltage level information from voltage regulator 266 and generator output shaft rotational information from speed sensor 290. Speed sensor 290 operates as described with respect to speed sensor 284 and tooth wheel 286. Speed pickup 290 outputs a signal with a frequency varying in accordance with the rotational speed of output shaft 262. Speed pickup 290 outputs a signal in response to passage of the individual gear teeth of toothed wheel 292. Electronic power governor 268 also receives input signals from generator 254. The status information signals received by electronic power governor 268 are input to gen set monitor 274 through interface module 276. In accordance with the particular power need and the output of voltage regulator 266, gen set monitor 274 generates control signals for return to electronic power governor 268 through interface module 276. In accordance with the particular control signals, electronic power governor 268 generates control signals input to generator 254 to vary the output thereof. Electronic power governor 268 also provides control signals to voltage regulator 266. In particular, electronic power governor can vary the engagement of generator 254 with output shaft 260 thereby varying the rotational speed of generator 254 which in turn varies the voltage output to voltage regulator 266.

Gen set monitor 274 also provides control signals to electronic device control module (EDCM) 296. Electronic device control module 296 receives control information from gen set monitor 274 regarding the power availability of the combined battery power source 246 and motor generator set 250. Electronic device control module 296 also receives variable battery voltages of 12 volts, 24 volts, and 36 volts resulting from selectively tapping specified battery combinations of battery power source 246. Electronic device control module 296 selectively actuates contactors 298 and 300 to provide power to drive control electrical energy to drive motor 304 via drive control module 303. Electronic device control module 296 also selectively actuates contactors 302 and 304 to operate reel motors 306 (only one of which is shown). Similarly, electronic device control module 296 selectively actuates contactors 308 and 310 to operate headlights 312. In this manner, electronic device control module 296 selectively operates electric devices at various, predetermined voltages in accordance with the opening and closing of the respective contactors. An operator provides input to electronic device control module 296 via a plurality of switches and dials which comprise an operator control panel (OCP) 314. Thus, in accordance with operator input from operator control panel 314, the electronic device control module 296 selectively activates the drive motor 304, the reel motor 306, and the headlights 312. Further, drive control module 303 varies the speed of the drive motor 304 via input from electronic device control module 296. In operation, the operator varies the position of a foot pedal which generates an input signal to electronic control module 296. The electronic drive control module 296 outputs a control signal to drive control module 303 which modulates the electrical energy applied to drive motor 304 to control the speed of drive motor 304 and, resultantly, the speed of the electrohydraulic mower 230.

The internal combustion motor 252 of motor generator set 250 also provides mechanical input to a hydraulic pump in order to provide pressure for a hydraulic control system to enable manipulation of the rear wheels to steer the electrohydraulic mower 230 and to raise and lower the reel mowers. Internal combustion motor 252 causes rotation of an output shaft 320 which causes rotation of an input shaft 322 via a coupling 324. Input shaft 322 provides rotational energy to the input side of electromagnetic powered clutch (EMPC) 326. An output shaft 328 of electromagnetic powered clutch 326 provides mechanical energy at the output of electromagnetic power clutch 326 to a variable volume displacement hydraulic pump 330. A hydraulic tank 332 stores hydraulic fluid input to the variable displacement hydraulic pump 330 through a filter 334 and an air to oil heat exchanger 336. Output pressure from variable displacement hydraulic pump 330 actuates a pressure switch 338. When the pressure within the hydraulic system drops below a predetermined threshold, the pressure switch 338 engages the electromagnetic powered clutch 326, thereby mechanically coupling the input shaft 322 and output shaft 328. This results in an increase in the hydraulic fluid pressure output from variable displacement hydraulic pump 330. Pressure in the hydraulic system is transferred through relatively rigid hydraulic tubing 340 and flexible hydraulic hose 342. The hydraulic hose 342 is generally a flexible hose which provides dampening of hydraulic noise resulting from the operation of the variable displacement hydraulic pump 330. An air-over-oil accumulator 342 provides a pressure reserve to compensate for pressure drops occurring upon actuation of variable displacement hydraulic pump 330.

The hydraulic fluid pressure is input to directional control valve (DCV) 346. The directional control valve 346 includes a pair of solenoids 348 and 350. Modulation of solenoid 348 results in hydraulic fluid flow through hydraulic control lines 356a and flexible hydraulic hose 352. Modulation of solenoid 348 results in the introduction of hydraulic fluid pressure into a first portion 354 of hydraulic fluid chamber 362. Actuation of solenoid 350 results in hydraulic fluid flow through hydraulic control lines 356b and flexible hydraulic hose 358 to enable introduction of hydraulic fluid pressure to a second portion 360 of the hydraulic fluid chamber 362. Operation of a switch pack on operator control panel 314 results in the selective actuation of solenoids 348 and 350. This selective actuation in turn enables fluid flow into a first portion 354 or second portion 360 of a hydraulic fluid chamber 362. The hydraulic fluid chamber 362 is fixed at one end 364 and includes a piston 366 separating the first portion 354 from the second portion 360 of the hydraulic fluid chamber 362. The piston connects to an output shaft 368. The output shaft connects to a reel lift lever 370 which is anchored at one end to a portion of the frame 232. Introduction of hydraulic fluid at pressure into one of the first or second portion of the hydraulic fluid chamber 362 results in a pressure imbalance thereby displacing the piston 366 and attached output shaft 368 within the fixed hydraulic fluid chamber 362. This displacement results in the raising and lowering of reel lift motor 372. Directional control valve 346 also includes an overflow line 374 for returning hydraulic fluid to hydraulic tank 332.

Fluid under pressure is also applied to a proportional control valve 380 which enables fluid flow through hydraulic lines and hoses 382, 384, and 386, 388, respectively. In accordance with rotation of steering wheel 391, fluid flow through proportional control valve 380 varies, thereby resulting in a variation in the hydraulic pressure applied to a first portion 390 or a second portion 392 of a hydraulic fluid chamber 394. The hydraulic chamber is fixed at at least one end 396 so that the pressure differential between the first portion 390 and a second portion 392 of hydraulic fluid chamber 394 results in displacement of piston rod 398. Displacement of piston rod 398 results in displacement of steering lever 400 which is fixed at one end 402 to the frame 232. Displacement of the piston rod 398 results in rotation of the steerable rear wheels 236 to effect steering of electrohydraulic mower 230.

Another particularly advantageous feature of this invention is the incorporation of various forms of sound abatement to significantly reduce the exterior noise levels generated by the electrohydraulic mower 230. Internal combustion motor 252 outputs exhaust through a muffler system 410 which is housed in a baffled enclosure 412 which includes sound abatement material 414 formed in a series of baffles which significantly reduces the sound output to the exterior of the housing 256. The material defining the baffles is preferably a refractory type material which is significantly resistive to the combustion byproduct gases typically emitted from an internal combustion motor. On the interior, the housing preferably includes a secondary sound abatement material 420 many of which are known in the art. The secondary sound abatement material 420 lines the interior of the sound abatement material 414 thereby providing an additional level of sound abatement. Optionally, the housing 256 may also include various forms of sound abatement material, many of which are well known in the art. Further yet, the housing 256 and the sound abatement material 414 and 420 also preferably includes an opening 422 to enable an input airflow to provide adequate temperature control. The housing 256 and sound abatement material 414 and 420 also preferably includes an exit passage 444 to assist in the free flow of air through housing 256, thereby maintaining an adequate operating temperature within the housing 256.

Figure 7:
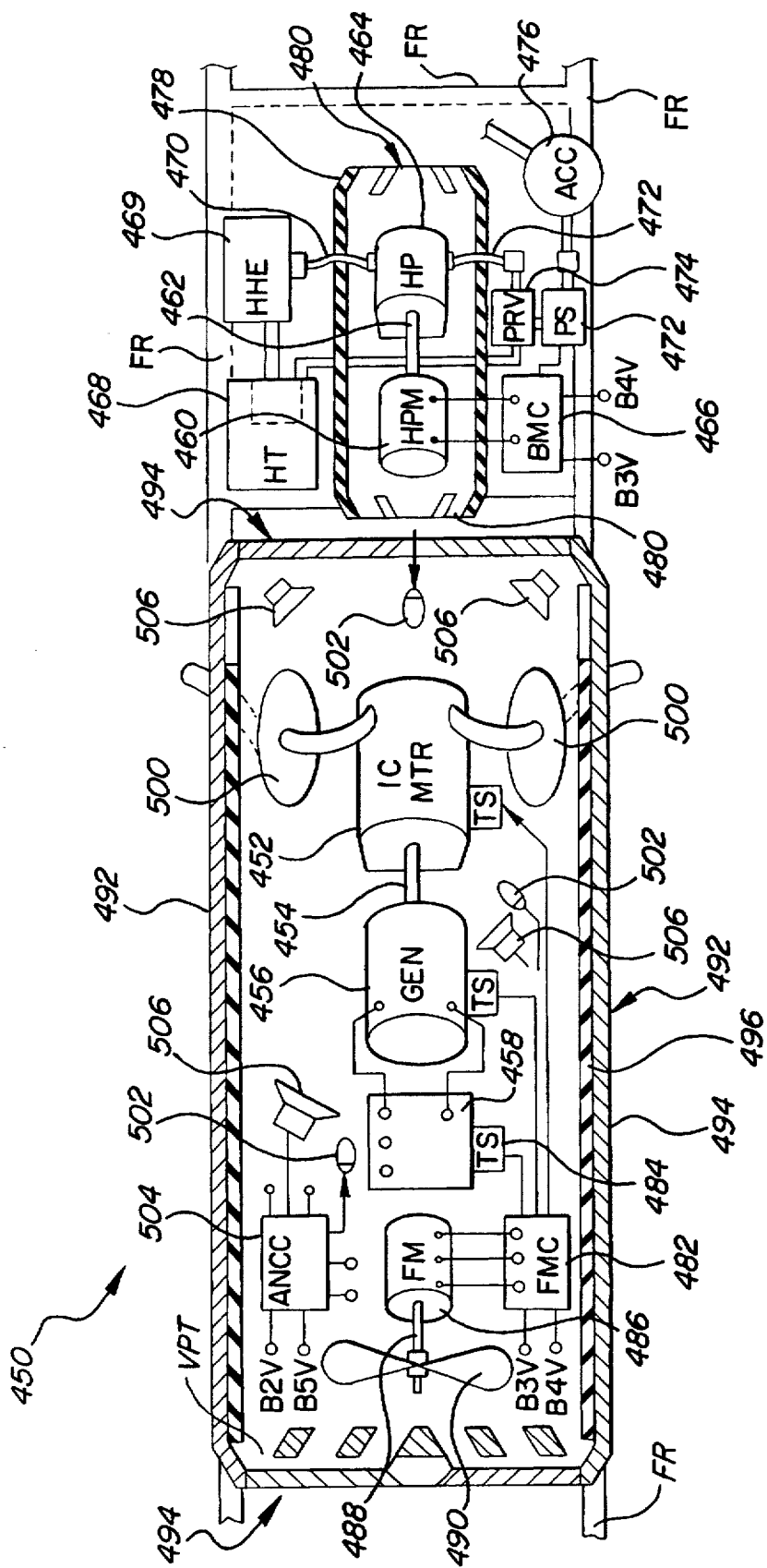
FIG. 7 shows a detailed block diagram showing a preferred motor generator set arrangement to provide electrical energy for driving a hydraulic pump motor and also having active noise cancellation for the motor generator set.

With regard to each of the above discussed mowers, there may be some situations in which it is desirable to provide a riding mower in which a motor generator set provides electrical energy for driving an electrically driven hydraulic pump motor which in turn drives a hydraulic pump to provide hydraulic fluid pressure. The hydraulic fluid pressure could operate the primary mover, the reel mower motors, the lift motors, and the rear wheel steering mechanism. Such a configuration significantly reduces the requirement for electric storage batteries to a starting battery to start the motor generator set. FIG. 7 depicts an electrohydraulic system 450 in which a motor generator set provides electrical energy to drive an electrically driven hydraulic pump motor. An internal combustion motor 452 outputs mechanical energy in the form of rotation of output shaft 454 to provide mechanical input to generator 456. Mechanical energy applied to generator 456 results in the output of electrical energy which is input to voltage regulator 458. The voltage regulator 458 in turn outputs a regulated voltage for driving the electronic components of the electrohydraulic system 450. In particular, voltage regulator 458 outputs a voltage applied to hydraulic pump motor 460. Hydraulic pump motor 460 is an electrically driven motor having an output shaft 462 for driving hydraulic pump 464. Hydraulic pump 464 generates a hydraulic fluid pressure which may be applied to the hydraulically actuated devices. Examples of such devices may be found with reference to the reel motors, the lift motors, the primary mover, and the steering mechanism.

In operation, a pump motor controller 466 modulates the electrical energy applied to hydraulic pump motor 460, thereby varying the speed of hydraulic pump motor 460 and the resultant output pressure generated by hydraulic pump 464. The hydraulic pump 464 receives hydraulic fluid stored in a hydraulic tank 468 which passes through a hydraulic heat exchanger 469 to cool the hydraulic fluid before introduction to hydraulic pump 464. Transfer of hydraulic fluid between hydraulic heat exchanger 469 and hydraulic pump 464 occurs through hydraulic hose 470. As described above, use of flexible hydraulic hose significantly reduces noise introduced in the system due to the operation of hydraulic pump 464. Hydraulic pump 464 outputs hydraulic fluid at a pressure to pressure switch 472 via pressure relief valve 474. Pressure relief valve 474 bleeds off fluid back to hydraulic tank 468 when hydraulic pressure exceeds a predetermined threshold to prevent an over-pressure condition in the hydraulic system. Pressure switch 472 provides feedback control to pressure motor controller 466 to actuate hydraulic pump motor 460 in order to maintain pressure at a predetermined level. An air over oil accumulator 476 stores reserve hydraulic pressure to compensate for pressure drops due to actuation of the hydraulic pump 464. Hydraulic fluid at pressure output from accumulator 476 is then input to the various hydraulically driven devices.

The hydraulic pump 464 and hydraulic pump motor 460 are preferably housed within an insulated compartment having a sound attenuating housing 478 to reduce external noise in the system, thereby further quieting the mower. The sound attenuating housing 478 preferably includes a ventilation panel 480 located at both ends of the sound attenuating housing 478 in order to provide ventilation to reduce operating temperatures of the hydraulic pump motor 460, the hydraulic pump 464, and associated components. To provide cooling of the motor generator set, the electrohydraulic system 450 also includes a fan motor controller 482 which receives input from a temperature sensor 484 mounted in proximity to voltage regulator 458. Temperature sensor 484 outputs a temperature signal to fan motor controller 482 varying in accordance with the temperature in proximity to voltage regulator 458. When the temperature in the proximity of the voltage regulator 458 reaches a predetermined threshold, fan motor controller 482 actuates fan motor 486. Fan motor 486 drives an output shaft 488 and resultantly causes rotation of cooling fan 490 in order to ventilate the housing 492 of the electrohydraulic system 450. The housing 492 also includes ventilation panels 495 at both ends in order to provide an airflow path so that warm air may be exhausted from the interior of the housing and cool air brought into the interior of the housing.

A particularly advantageous feature of the embodiment of FIG. 7 is the introduction of both passive and active sound abatement. Regarding passive sound abatement, housing 492 is preferably formed of sound attenuating metallic material which provides both sound abatement and a protective outer shell for the interior components. Mounted to the interior of housing 492 is an additional layer of sound attenuating material 496. This sound attenuating material 496 preferably is a resilient material, such as glass-reinforced closed cell urethane sheet. As a further form of passive sound abatement, internal combustion motor 452 outputs exhaust through a pair of mufflers 500 which partially attenuate the sound produced by internal combustion motor 452.

The present embodiment also discloses a second type of noise cancellation, namely, active noise cancellation. The active notice cancellation system includes one or a plurality of microphones 502 which provide an input signal to active noise cancellation controller 504. Active noise cancellation controller 504 analyses the signal input from each microphone and generates a negative signal 180 degrees out-of-phase with the received input signal. The active noise cancellation controller outputs the negative signal to the output speaker 506 corresponding to the microphone which generated that particular signal. The output speakers 506 thus generates an audio output corresponding to the negative of the audio signal detected by the associated microphones 502. This cancels the noise in that particular vicinity. Thus, the present system further reduces the external sound generated by the turf mower.

Figure 8:
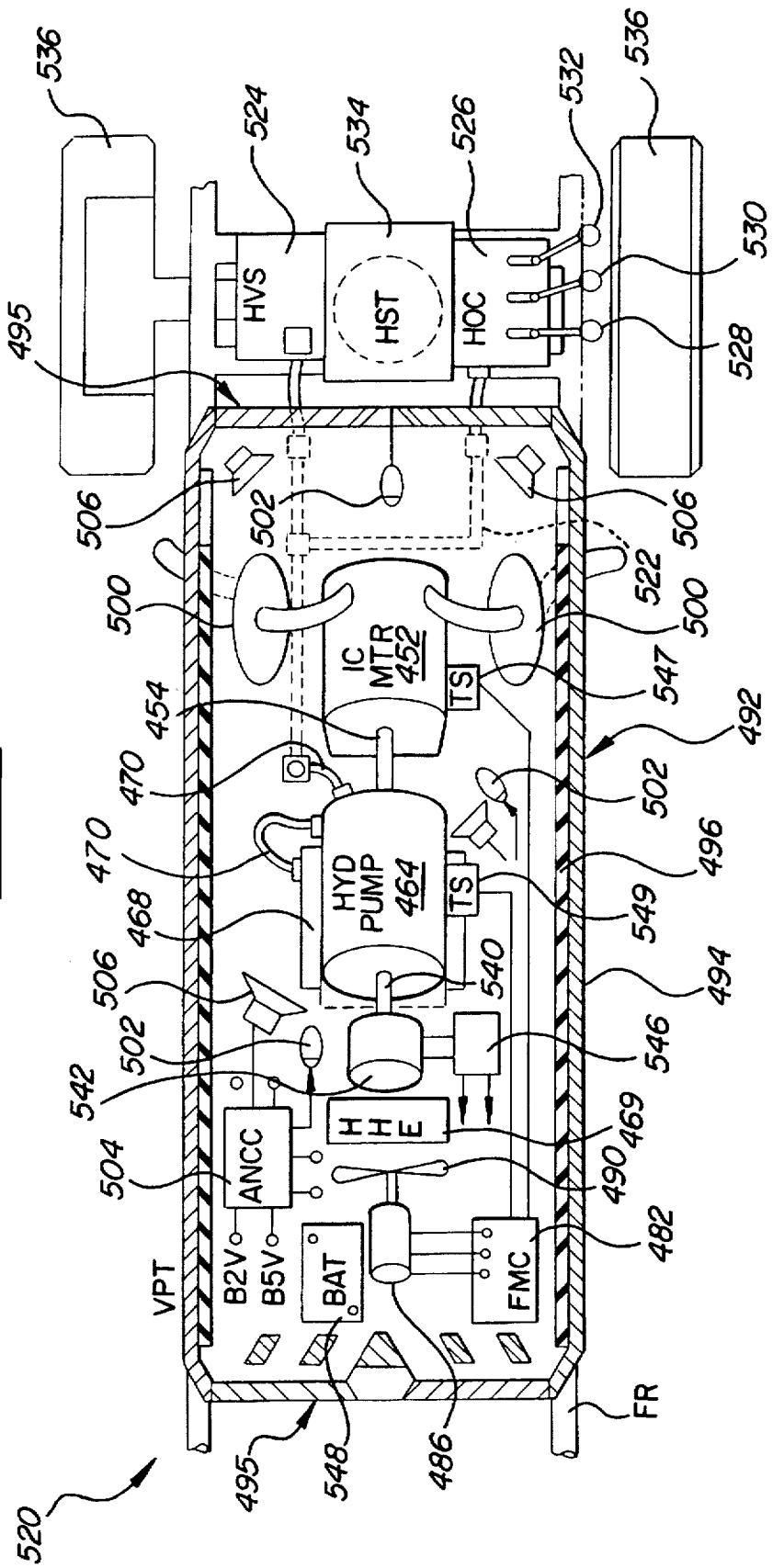
FIG. 8 shows a detailed block diagram showing a preferred motor generator set arrangement which provides mechanical energy for driving the hydraulic pump mower and which includes active noise cancellation to limit noise output by the motor generator set and the hydraulic pump.

FIG. 8 depicts a second embodiment of a hydraulic drive system 520 of the present invention in which an internal combustion motor drives the hydraulic pump directly. Note that like referenced numerals will be used to refer to similar elements described in FIG. 7, which operates similarly and will be described only minimally. An internal combustion motor 452 operates to cause rotation of an output shaft 454 which is coupled with hydraulic pump 464. Rotation of hydraulic pump 464 pressurizes fluid received from hydraulic tank 468 via hydraulic hose 470. Hydraulic pump 464 outputs hydraulic fluid at a pressure via hydraulic hose 470 and tubing 522 to hydraulic valve stock 524 and hydraulic operator controls 526. By manipulation of hydraulic operator controls 526, which include individual controls 528, 530, and 532, the operator may engage hydrostatic transmission 534. Hydrostatic transmission 534 provides mechanical energy for turning drive wheels 536. Note that through operation of the selected individual controls 528, 530, and 532, the drive wheels 536 may be operated independently so as to provide a drive wheel steering capability to the turf mower. Hydraulic pump 464 also includes an output shaft 540 which provides mechanical input to alternator 542. Alternator 542 outputs voltage to voltage regulator 546. The output for voltage regulator 546 is in turn input to battery 548 and provides a charging energy to battery 548.

Temperature control of the interior of the housing 492 is provided by means of airflow through ventilation panels 495 which include a series of vent ports to enable the exhaust of warm air and the introduction of cooler air to cool the housing. To further augment cooling, a fan motor controller 482 monitors two temperature sensors, a first temperature sensor 547 is placed in proximity to internal combustion motor 452, and a second temperature sensor 549 is placed in proximity to hydraulic pump 464. Fan motor controller 482 monitors the input signal received from each of the respective temperature sensors 547 and 549. When the temperature indicated by either of the sensors exceeds a predetermined threshold, fan motor controller 482 actuates fan motor 486 to cause rotation of cooling fan 490. Cooling fan 490 provides an airflow over hydraulic heat exchanger 469 and other components within the housing 492.

In the present embodiment, noise cancellation occurs similarly as described with respect to FIG. 7, including both passive and active noise cancellation. Regarding passive noise cancellation, sound attenuating housing 492 includes a sound attenuating metallic material 494 defining the exterior of the sound attenuating housing 492. The sound attenuating metallic material 494, a resilient sound attenuating material 496 is mounted interiorly to the exterior sound attenuating metallic material 494. Further, the present embodiment also includes active noise cancellation which operates as described above with respect to FIG. 8.

Figure 9:
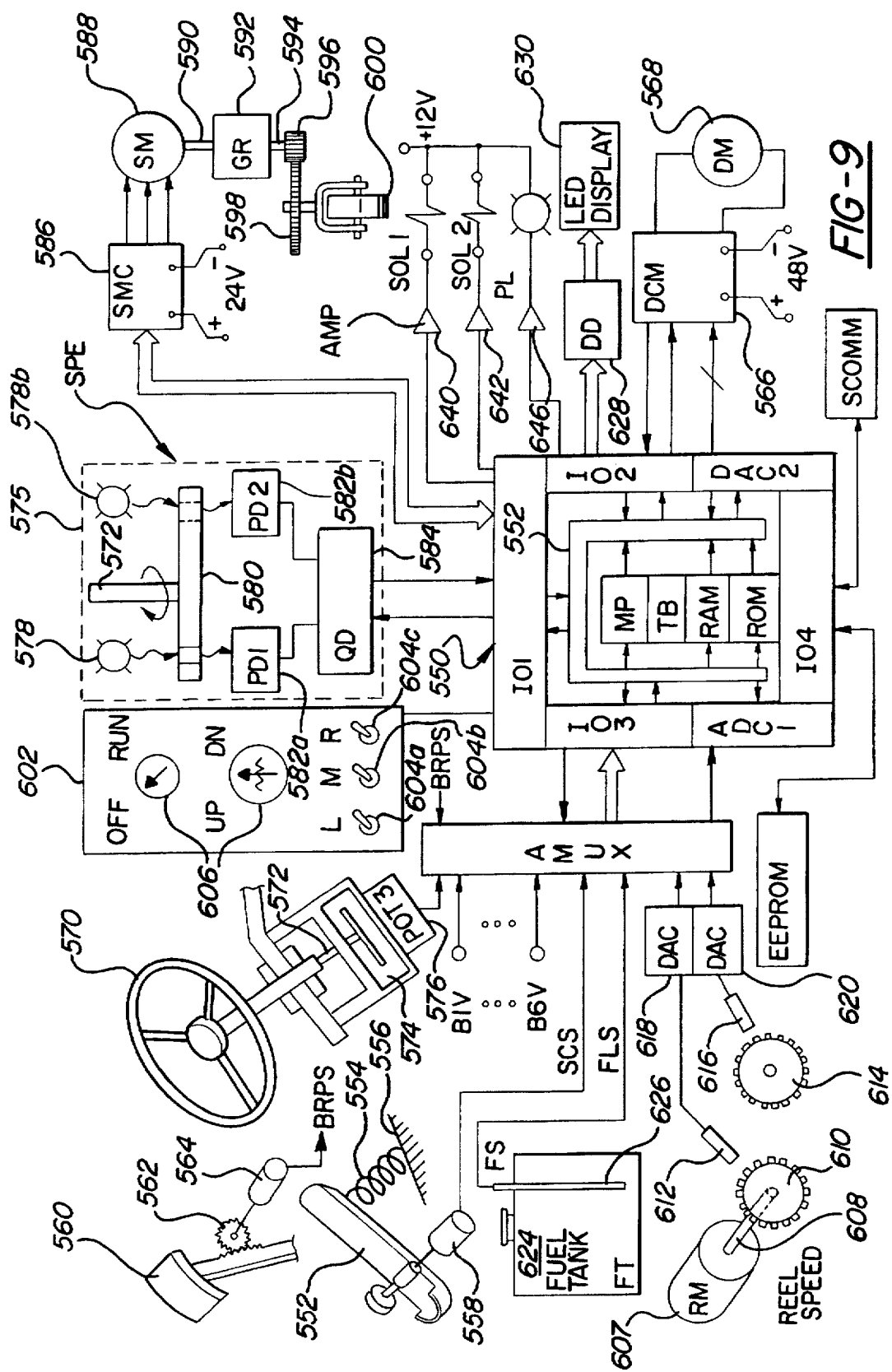
FIG. 9 is a detailed block diagram of an electronic control system of the present invention which uses a microprocessor based controller to modulate the power output of the motor generator set, actuate the electric devices, and direct fly-by-wire electric steering through an electric motor.

In yet an additional embodiment, the present invention also contemplates a fly by wire system in which a microprocessor receives operator control inputs and generates control outputs to effect steering and drive operations of the electric mower. FIG. 9 depicts a block diagram of such an embodiment. A microcomputer 550 includes a microprocessor (MP), a clock or time base (TB), such as a controlled crystal oscillator, a random access memory (RAM), and a read only memory (ROM). The elements of the microcomputer communicate via a bus 552 which enables the transfer of data between each of the above described elements. Microcomputer 550 also includes various input and output ports and adapters. For example, microcomputer 550 includes input/output ports IO1, IO2, IO3, and IO4 for enabling the input and output of digital signals. Microcomputer 550 also includes an analog-to-digital converter (ADC1) for the conversion of input signals from analog to digital format and a digital-to-analog converter (DAC2) for the conversion of digital to analog signals for output. Programming and control information may be stored in electrical erasable programmable read only memory (EEPROM) which communicates with microcomputer 550 via input/output port IO4. The EEPROM is configured as a read only memory which may be rewritten in accordance with electrical inputs. Thus, the EEPROM is particularly useful for storing various control and calibration parameters which may vary in accordance with the particular function and configuration of the mower on which the system of FIG. 9 is installed. Similarly, additional input and output information (such as for diagnostics) may be communicated with microcomputer 550 via serial communications interface (SCOMM) which also communicates with microcomputer 550 via input/output port IO4. Each of the input/output ports communicates with the other elements of microcomputer 550 via bus 552.

In operation, microcomputer 550 effectuates fly-by-wire operation of several different systems of the electric mower, such as raising and lowering and engagement and disengagement of the reel mowers, speed control, steering control, and various other functions. Regarding speed control, microcomputer 550 receives inputs related to speed control from the drive pedal 552, the brake pedal 560, and the drive motor 568. Microcomputer 550 determines the operator desired speed of the electric mower in accordance with the position drive pedal 552. Depressing drive pedal 552 against the biasing force supplied of spring 554, which is seated on a fixed spring seat 556, causes rotation of potentiometer 558. Varying the position of potentiometer 558 generates a speed command signal (SCS) which is input to microcomputer 550 through input/output port IO3. The speed command signal is multiplexed through an analog multiplexer (AMUX) which receives control signals then input to ports IO3 and ADC1. Microcomputer 550 similarly determines the position of brake pedal 560. When the operator depresses brake pedal 560, meshing engagement of a tooth gear or sprocket 562 causes rotation of potentiometer 564. Rotation of potentiometer 564 results in a corresponding variation in the brake pedal signal (BRPS) which is also input to microcomputer 550 through the AMUX and one of input/output port IO3 or ADC1. Based on the position of the drive pedal 552 and brake pedal 560 which generate an SCS and BRPS signal, respectively, microcomputer 550 determines the speed of the electric mower desired by the operator. In accordance therewith, microcomputer 550 determines the speed of the mower and the current output of the drive motor 568 and produces one or a plurality of control signals output to drive control module 566. Such signals include a digital signal provided from input/output port IO2 and an analog signal from digital-to-analog converter DAC2. In accordance with the control signals, the drive control module 566 modulates the output voltage to drive motor 568. In addition to the above-discussed low level control signals, drive control module 566 is also biased with a 48 volt DC signal which provides the driving energy to drive motor 568. Drive control module 566 also provides additional feedback information to microcomputer 550 via input/output port IO2, and such information may indicate the present status and diagnostic information for drive motor 568 and drive control module 566.

The present embodiment also incorporates fly-by-wire steering in which electrical signals generated by manipulation of a steering wheel 570 are input to microcomputer 550 to generate control signals for operating a steering motor 588 to cause a corresponding adjustment of the steerable rear wheel 600 in accordance with the present position and the desired steering angle. In particular, an operator manipulates the steering wheel 570 in accordance with a conventional steering apparatus to cause rotation of shaft 572. A shaft position encoder 574 mechanically communicates with the shaft 572 and generates position signals input to microcomputer 550 through input/output port IO1. In a first embodiment, the shaft 572 causes displacement of a potentiometer 576 which causes a resultant output signal input to microcomputer 550 through analog multiplexer (AMUX). In a second embodiment, referring to block 575 shown in phantom, a shaft position encoder 574 provides steering wheel position information to microcomputer 550. The shaft position encoder 574 includes a pair of light emitting diodes (LEDs) 578a and 578b. The LEDs 578a and 578b provide a light source directed through holes formed in a disc 580 attached to shaft 572. Rotation of shaft 572 provides a corresponding rotation of disc 580. Rotation of disc 580 blocks the light paths between LEDs 578a and 578b and photodetectors 582a and 582b, respectively. Photodetectors 582a and 582b provide output signals to quadriture detector 584. Quadriture detector 584 determines the displacement and direction of rotation of steering wheel 570 in accordance with the sequence of rising and falling pulses provided by photodetectors 582a and 582b. Such shaft position encoding is well known to one skilled in the art. Quadriture detector 584 provides an input signal to microcomputer 550 through input/output port IO1. Microcomputer 550 in accordance with the signal provided by quadriture detector 584 generates output signals in accordance with the rotational displacement and direction of steering wheel 570. The output signals generated by microcomputer 550 provides control information to steering motor controller 586. Steering motor controller 586 generates the appropriate control signals to direct the rotation of steering motor 588. Steering motor 588 includes an output shaft 590 which provides mechanical input to gear reducer 592. Gear reducer 592 generates rotational motion of an output shaft 594, at the end of which is attached a tooth gear 596. Tooth gear 596 engages a corresponding set of teeth on a sprocket 598. Thus, actuation of steering motor 588 results in rotational movement of sprocket 598 which is in turn attached to steerable rear wheel 600. Steering motor 588 may preferably be a servo motor or any other by-directional motor, may of which are well known to one skilled in the art. A 24 volt signal applied to steering motor controller 586 provides the electrical driving energy for steering motor 588.

The present embodiment also includes fly-by-wire control of the raising and lowering and the engagement of the reel motors. In particular, an operator control panel 602 includes a trio of switches 604a, 604b, and 604c. Switches 604a, 604b, and 604c control the raising and lowering of the left, middle, and rear mowers, respectively, as is found in a triplex mower configuration. Operator control panel 602 also includes a run switch 606 which enables operation of the reel mowers in the run position and disables operation of the reel mowers in the off position. Operator control panel 602 also includes a lift control switch 606 for raising and lowering the reel mowers in accordance with the position of the switch 606. The output from operator control panel 602 is input to microcomputer 550 at input/output port IO1. Depending upon the position of the respective switches, microcomputer 550 generates the appropriate output signal to operate the respective mowers.

The fly-by-wire system of FIG. 9 also provides input to microcomputer 550 indicating the rotational speed of the respective reel mowers and the ground speed. For example, reel mower 607 rotatably displaces the output shaft 608 resulting in a corresponding rotation of toothed wheel 610. As the teeth of toothed wheel 610 pass tachometer pickup 612, tachometer pickup 612 outputs a frequency signal varying in accordance with the rotational speed of output shaft 608. Similarly, a toothed with the ground s in accordance with the ground speed of the electric mower. As the teeth of wheel 614 pass tachometer pickup 616, tachometer pickup 616 outputs a frequency signal varying in accordance with the rotational speed of toothed wheel 614. Each of the frequency signals output by tachometer pickups 612 and 616 are input to digital to analog (DAC) converters 618 and 620, respectively. The digital to analog converters 618 and 620 convert the digital frequency signal to an analog signal whose value varies in accordance with the frequency of the digital input signal. DACs 618 and 620 output an analog signal to analog multiplexer (AMUX) which is in turn input to microcomputer 550 through analog-to-digital converter (ADC1) or input/output port IO3. Of course, it will be understood by one skilled in the art that the frequency signals output by tachometer pickups 612 and 616 may be input directly to a digital input of microcomputer 550 which could then directly determine the frequency of the input signal in order to obtain the rotational speed of the reel to yield the vehicle speed. Further, it will be understood by one skilled in the art that microcomputer 550 may perform several functions incorporating the reel speed and mower speed information, including varying the output speed signals for operating the drive control module 566 and the reel speed.

A further feature of the embodiment of FIG. 9 involves implementing an operator information center to provide the operator with pertinent control information. For example, the fuel tank 624 includes a fuel sensor 626 which outputs a fuel level signal to analog multiplexer (AMUX) which is input to microcomputer 550 through input/output port IO3. Fuel sensor 626 may be any of a number of fuel sensors known in the art. Similarly, battery voltage levels of, for example, the six system batteries may be input into analog multiplexer AMUX as signals B1V, B2V, B3V, B4V, B5V, and B6V. The battery voltage analog signal are to microcomputer 550 though analog-to-digital convertor ADC1 or input/output port IO3. In response to these signals, microcomputer 550 provides mower information embodied as signals output through input/output port IO2 to display driver 628. Display driver 628 generates the appropriate control signals to operate LED display 630. In this manner, the LED display 630 provides the operator with pertinent control information.

Microcomputer 550 further may operate a pair of solenoids SOL1 and SOL2 through a pair of amplifiers 640 and 642, respectively. Solenoids SOL1 and SOL2 are operable to control any of a plurality of possible functions of an electric riding mower. Further yet, microcomputer 550 may actuate pilot light PL by generating a control signal from input/output port IO2. The signal generated from input/output port IO2 is set to amplifier 646 and selectively actuates pilot light PL.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, drive motors, reel motors, lift motors and steering motors of different voltages may be utilized, and the taps into the battery packs may be changed accordingly. Further, gear boxes may be used between the reels and reel motors if desired, and the number of batteries in the battery pack may be varied as needed.

While the present invention has been discussed with respect to riding mowers having reel-type mowing heads, those skilled in the art will appreciate that it may be applied to electrically-powered riding mowers having multiple rotary mowing heads. In addition, the electrical control systems, generator set arrangements, and virtually all other aspects of the present invention may be used in connection with other turf care equipment used to tend large expanses of grass. For example, electrically-powered riding sprayers, aerators, dethatchers, and other equipment which would be beneficially operated in a pollution-free way with extremely low noise would benefit by the systems and structures of the present invention. In other words, except for the working tool being a mowing head, most such equipment can be readily adapted to utilize the various aspects of the present invention. Thus, the term "turf care machine" or "turf care equipment" if used in the claims below is to be understood to extend to all such forms of power-consuming equipment when arranged to be operated and/or driven using electrical motors and/or electrically-powered work-producing devices. Accordingly, it is to be understood that the protection sought and to be afforded hereby should be deemed to extend to the subject matter as defined by the appended claims, including all fair equivalents thereof.

We claim:

1. A self-propelled riding mower comprising:

a frame;

a plurality of ground engaging wheels supporting the frame;

means for mechanically generating electrical energy supported from the frame; and a plurality of reel type lawn mowers supported from the frame and one of the plurality of reel type lawn mowers located forward of each of the plurality of ground engaging wheels, the reel type lawn mowers being moveable between a raised non-operative position and a lowered operative position in which the reel type lawn mowers engage the ground, each reel mower being driven by a respective electric motor which receives electrical power from the means for generating electrical energy.

2. The self propelled riding mower as defined in claim 1 further comprising a prime mover comprising an electric motor supplied with electrical energy from the means for generating electrical energy and adapted to provide driving torque to at least one of the ground engaging wheels.

3. The self-propelled riding mower of claim 1 wherein the means for generating electrical energy comprises a motor generator set.

4. The self-propelled riding mower of claim 1 wherein the means for mechanically generating electrical energy further comprises:

an internal combustion motor; and a means for generating electrical energy in response to mechanical motion, the internal combustion motor operatively connected to the generating means to impart the mechanical motion required to generate electrical energy.

5. The self propelled riding mower as defined in claim 4 further comprising a regulator circuit for modulating the electrical output of the means for generating electrical energy.

6. The self-propelled riding mower of claim 5 wherein the means for mechanically generating electrical energy further comprises a circuit for monitoring the electrical output of the generator means and the electrical output of the regulator circuit, the circuit disabling the means for generating electrical energy from outputting electrical energy when the circuit detects a non-standard electrical energy output condition.

7. The self-propelled riding mower of claim 1 further comprising a source of stored electrical energy, the source of stored electrical energy providing electrical energy in addition to the electrical energy output by the means for generating electrical energy.

8. The self-propelled riding mower of claim 1 further having a hydraulic fluid system comprising:

hydraulic fluid stored in a reservoir;

hydraulic pressure generating means for receiving hydraulic fluid from the reservoir at an input pressure and providing hydraulic fluid at an output pressure; and a hydraulically actuated device responsive to the application of hydraulic fluid pressure provided by the hydraulic pressure generating means.

9. The self-propelled riding mower of claim 8 further comprising an electric motor operatively connected to and driving the hydraulic pressure generating means, the electric motor receiving electrical energy from the means for generating electrical energy to operate the electric motor.

10. The self-propelled riding mower of claim 9 further comprising a clutch interconnecting the electric motor and the hydraulic pressure generating means in order to vary the force transferred between the electric motor and hydraulic pressure generating means.

11. The self-propelled riding mower of claim 8 further comprising a source of stored electrical energy, the source of stored electrical energy also providing electrical energy in addition to the electrical energy output by the means for generating electrical energy.

12. The self propelled riding mower as defined in claim 11 further comprising an electric motor driving the hydraulic pressure generating means, where electrical energy output by the means for storing electrical energy is applied to the electric motor to operate the pressure generating means.

13. The self-propelled riding mower of claim 12 further comprising a clutch interconnecting the electric motor and the hydraulic pressure generating means in order to vary the force applied to the electric motor to the hydraulic pressure generating means.

14. The self-propelled riding mower of claim 8 wherein the means for mechanically generating electrical energy further comprises:

an internal combustion motor; and a means for generating electrical energy in response to mechanical motion, the internal combustion motor operatively connected to the generating means to impart the mechanical motion required to generate electrical energy.

15. The self-propelled riding mower of claim 14 wherein the internal combustion motor mechanically powers the source of hydraulic fluid pressure.

16. The self-propelled riding mower of claim 14 further comprising a clutch interconnecting the hydraulic pressure generating means and the internal combustion motor in order to vary the force transferred between the internal combustion motor and hydraulic pressure generating means.

17. The self-propelled riding mower of claim 8 wherein there are at least three ground engaging wheels and wherein the prime mover further comprises a drive axle positioned between two of the wheels for delivering driving torque to each of the two wheels and wherein the third wheel is located rearward of the drive axle and may be rotatably displaced to steer the turf mower.

18. The self-propelled riding mower of claim 17 further comprising a hydraulic piston responsive to hydraulic fluid pressure provided by the hydraulic pressure generating means and operatively connected to the third wheel so that extension of the hydraulic piston rotatably displaces the third wheel in a first direction and retraction of the hydraulic piston rotatably displaces the third wheel in an opposite direction to steer the turf mower.

19. A self-propelled riding mower comprising:

a frame;

a plurality of ground engaging wheels supporting the frame;

an internal combustion motor supported from the frame;

a means for generating electrical energy in response to mechanical motion, the internal combustion motor operatively connected to the generating means to impart the mechanical motion required to generate electrical energy;

a plurality of reel type lawn mowers supported from the frame and one of the plurality of reel type lawn mowers located forward of each of the plurality of ground engaging wheels, each reel mower being driven by a respective electric motor which receives electrical power from the means for generating electrical energy; and a prime mover adapted to provide driving torque to at least one of the ground engaging wheels, the prime mover comprising an electric motor supplied with electrical energy from the means for generating electrical energy.

20. The self propelled riding mower as defined in claim 19 wherein the means for generating electrical energy outputs a direct current electrical signal, and the prime mover is an electric motor powered by a direct current electrical signal.

21. The self propelled riding mower as defined in claim 19 wherein the means for generating electrical energy outputs an alternating current electrical signal, and the prime mover is an electric motor powered by an alternating current electrical signal.

22. The self propelled riding mower as defined in claim 19 further comprising a voltage regulator for monitoring the voltage output by the means for generating electrical energy, the voltage regulator modulating the voltage output by the means for generating electrical energy and supplying a regulated voltage for use by the electrical components of the mower.

23. The self propelled riding mower as defined in claim 19 wherein the means for generating electrical energy outputs an alternating current electrical signal, and the prime mover is an electric motor powered by a direct current electrical signal, and the mower further comprises a means for transforming the alternating current electrical signal into a direct current electrical signal for application to the electric motor.

24. The self-propelled riding mower as defined in claim 23 further comprising a source of stored electrical energy, the source of stored electrical energy providing electrical energy to the electric motor in addition to the means for generating electrical energy.

25. The self-propelled riding mower as defined in claim 23 further comprising a motor controller for modulating the electrical energy applied to the prime mover, thereby varying the output of the prime mover in accordance with the modulated energy applied to the prime mover.

26. The self propelled riding mower as defined in claim 19 wherein the means for generating electrical energy outputs a direct current electrical signal, and the prime mover is an electric motor powered by a direct current electrical signal, and the mower further comprises a means for modulating the electrical output of the means for generating electrical energy for application to the electric motor.

27. The self-propelled riding mower as defined in claim 26 further comprising a source of stored electrical energy, the source of stored electrical energy providing electrical energy to the electric motor in addition to the means for generating electrical energy.

28. The self-propelled riding mower as defined in claim 26 further comprising a motor controller for modulating the electrical energy applied to the prime mover, thereby varying the output of the prime mover in accordance with the modulated energy applied to the prime mover.

29. The self propelled riding mower as defined in claim 19 wherein the means for generating electrical energy outputs an alternating current electrical signal, and the prime mover is an electric motor powered by an alternating current electrical signal, and the mower further comprises a means for modulating the electrical output of the means for generating electrical energy for application to the electric motor.

30. The self-propelled riding mower as defined in claim 29 further comprising a source of stored electrical energy, the source of stored electrical energy providing electrical energy to the electrical motor in addition to the means for generating electrical energy.

31. The self-propelled riding mower as defined in claim 29 further comprising a motor controller for modulating the electrical energy applied to the prime mover, thereby regulating the output of the prime mover in accordance with the modulated energy applied to the prime mover.

32. The self propelled riding mower as defined in claim 19 wherein the means for generating electrical energy outputs a direct current electrical signal, and the prime mover is an electric motor powered by an alternating current electrical signal, and the mower further comprises a means for modulating the electrical output of the means for generating electrical energy for application to the electric motor.

33. The self-propelled riding mower as defined in claim 32 further comprising a source of stored electrical energy, the source of stored electrical energy providing electrical energy to the electric motor in addition to the means for generating electrical energy.

34. The self-propelled riding mower as defined in claim 32 further comprising an inverter for transforming the direct current signal output by the means for generating electrical energy to an alternating current electrical signal for application to the prime mover, and further regulating the output of the prime mover in accordance with varying the input voltage applied to the prime mover.

35. The self propelled riding mower as defined in claim 19 further comprising a motor controller for modulating the electrical energy applied to the prime mover, thereby regulating the output of the electric motor in accordance with the modulated energy applied to the prime mover.

36. The self-propelled riding mower as defined in claim 19 further comprising an electronic control module for receiving operator input to direct operation of the prime mover and for generating control signal to at least one of a voltage regulator or a motor controller.

37. The self-propelled riding mower as defined in claim 36 wherein the operator inputs include at least one of a drive pedal signal, a brake pedal signal, and operator mower request signal.

38. The self-propelled riding mower as defined in claim 36 wherein the electronic control circuit further comprises a reel motor controller and a lift motor controller corresponding to each of the respective reel motors and lift motors.

39. A self-propelled riding mower comprising:

a frame;

a plurality of ground engaging wheels supporting the frame;

means for mechanically generating electrical energy;

hydraulic pressure generating means for receiving hydraulic fluid at an input pressure and providing hydraulic fluid at an output pressure;

drive means powered by electrical energy produced by the means for generating electrical energy, the drive means providing mechanical drive to the hydraulic pressure generating means to enable the output of hydraulic fluid at the output pressure; and a plurality of reel type lawn mowers supported from the frame and one of the plurality of reel type lawn mowers located forward of each of the plurality of ground engaging wheels, the reel type lawn mowers being moveable between a raised non-operative position and a lowered operative position in which the reel type lawn mowers engage the ground, each reel mower being driven by a respective electric motor which receives electrical power from the means for generating electrical energy.

40. The self propelled riding mower as defined in claim 39 wherein the drive means further comprises an electric motor.

41. The self-propelled riding mower as defined in claim 39 further comprising a pump motor controller for modulating the electrical energy applied to the drive means to modulate the electrical energy applied to the drive means, thereby varying the hydraulic fluid output pressure in accordance with the modulated electrical energy.

42. The self-propelled riding mower as defined in claim 39 further comprising a voltage regulator receiving as input electrical energy from the means for mechanically generating electrical energy and providing an output electrical energy within a predetermined range.

* * * * *